US011407626B2

(12) United States Patent
Graham

(10) Patent No.: US 11,407,626 B2
(45) Date of Patent: *Aug. 9, 2022

(54) BOTTLE POPPER WITH PIVOTING HANDLE

(71) Applicant: Clinton Graham, Milton, MA (US)

(72) Inventor: Clinton Graham, Milton, MA (US)

(*) Notice: Subject to any disclaimer, the term of this patent is extended or adjusted under 35 U.S.C. 154(b) by 762 days.

This patent is subject to a terminal disclaimer.

(21) Appl. No.: 16/395,899

(22) Filed: Apr. 26, 2019

(65) Prior Publication Data
US 2019/0330036 A1 Oct. 31, 2019

Related U.S. Application Data

(60) Provisional application No. 62/663,401, filed on Apr. 27, 2018, provisional application No. 62/716,026, filed on Aug. 8, 2018.

(51) Int. Cl.
B67B 7/16 (2006.01)
G01K 1/143 (2021.01)
G01K 13/00 (2021.01)

(52) U.S. Cl.
CPC .............. B67B 7/162 (2013.01); G01K 1/143 (2013.01); G01K 13/00 (2013.01)

(58) Field of Classification Search
CPC ... B67B 7/16; B67B 7/162; B67B 2007/0488; G01K 1/143; G01K 13/00; G01K 2207/08
See application file for complete search history.

(56) References Cited

U.S. PATENT DOCUMENTS

| 4,414,866 | A | | 11/1983 | Kichijyo |
| 4,911,038 | A | * | 3/1990 | Ferrin ........................ B67B 7/44 81/3.4 |
| 5,067,529 | A | * | 11/1991 | Gonzalez-Miller ........................ B09B 2101/02 141/97 |
| 7,196,624 | B2 | * | 3/2007 | Teller ................... B67D 3/0077 222/23 |

(Continued)

FOREIGN PATENT DOCUMENTS

| CN | 202988676 U * | 6/2013 | ............... B67B 7/14 |
| DE | 3838237 | 5/1990 | |

(Continued)

OTHER PUBLICATIONS

King Poppi—Popping Bottle Opener Party—KingPoppi.com. YouTube. Aug. 3, 2018 (retrieved on Nov. 6, 2019) 1 page.

(Continued)

Primary Examiner — Tung S Lau

(57) ABSTRACT

A bottle opener apparatus comprises a bottle rest configured to rest on a portion of a bottle placed within the bottle opener, a lower body collar attached to the bottle rest, an upper body collar slidably connected to the lower body collar, one or more levers attached to the upper body collar and to the lower body collar, the one or more levers configured to remove a bottle cap from the bottle and eject the bottle cap into the air when the upper collar slides relative to the inner collar in an ejection movement, one or more sensors configured to collect data when the bottle is placed within the inner collar, and a transmitter configured to transmit the collected data to an external receiver.

8 Claims, 15 Drawing Sheets

(56) References Cited

U.S. PATENT DOCUMENTS

| | | | | |
|---|---|---|---|---|
| 7,265,673 | B2* | 9/2007 | Teller | G06Q 20/203 |
| | | | | 222/23 |
| 8,869,654 | B2* | 10/2014 | Fidrych | A01K 27/006 |
| | | | | 119/863 |
| 9,179,648 | B1* | 11/2015 | Fidrych | B67B 7/16 |
| 2007/0146154 | A1* | 6/2007 | Teller | G07F 13/025 |
| | | | | 340/606 |
| 2018/0155096 | A1* | 6/2018 | Pan | B67B 7/16 |
| 2018/0170736 | A1* | 6/2018 | Graham | G01K 1/143 |
| 2019/0062136 | A1* | 2/2019 | Pearson | B67B 7/403 |

FOREIGN PATENT DOCUMENTS

| | | | | |
|---|---|---|---|---|
| DE | 102011114451 | | 5/2012 | |
| GB | 2492552 | | 1/2013 | |
| GB | 2492552 A | * | 1/2013 | B67B 7/164 |
| NL | 1014242 | | 8/2001 | |

OTHER PUBLICATIONS

International Search Report and Written Opinion in corresponding PCT Application No. PCT/US2019/029357 dated Jul. 8, 2019, pp. 1-9.

* cited by examiner

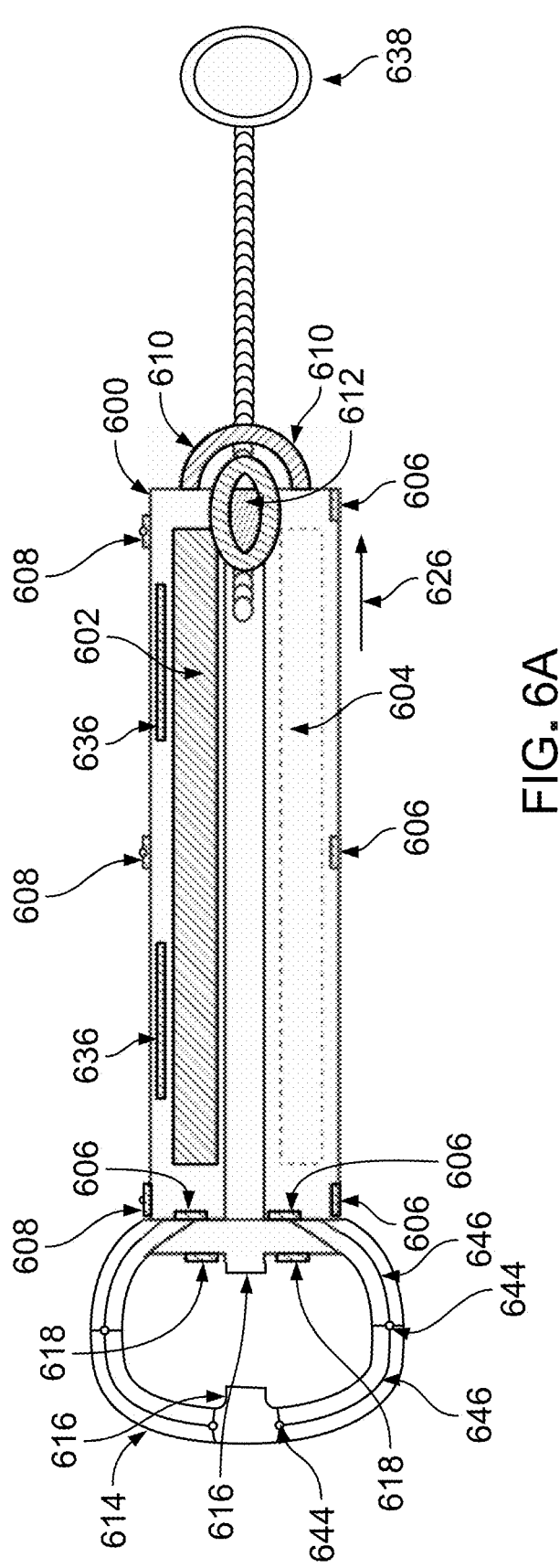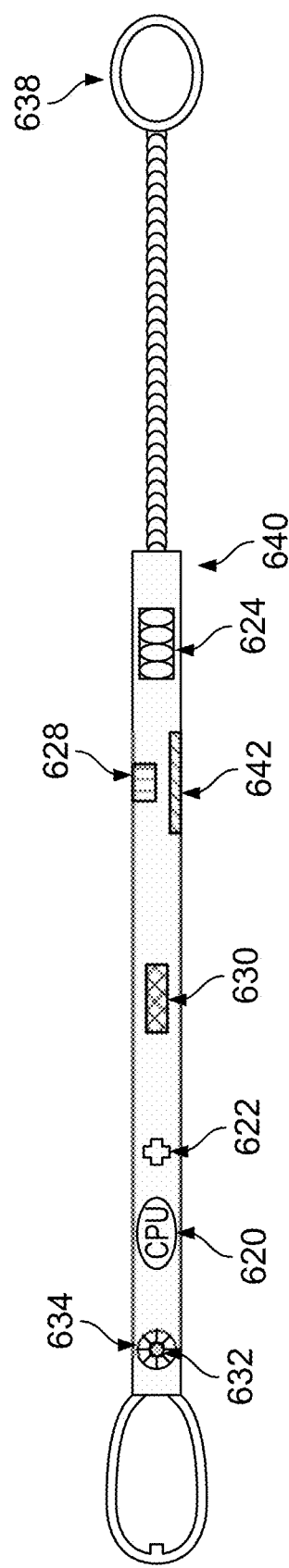
FIG. 6A
FIG. 6B

BOTTLE POPPER WITH PIVOTING HANDLE

RELATED APPLICATIONS

This application claims priority under 35 U.S.C. § 119(e) to provisional U.S. Patent Application 62/663,401, filed on Apr. 27, 2018 and also claims priority under 35 U.S.C. § 119(e) to provisional U.S. Application 62/716,026, filed on Aug. 8, 2018, the entire contents of which are hereby incorporated by reference.

TECHNICAL FIELD

This invention relates to bottle openers.

BACKGROUND

Soda, beer, champagne and wine bottles have been opened in various ways throughout the years. Some ways have been more tedious than others. Generally, the experience of opening a bottle is a rather mundane task and simply executes the function of opening the container. While some bottles employ removable corks and tabs, a considerable number of bottles include a removable cap that is made out of one or more metallic materials.

SUMMARY

In some embodiments, a bottle opener apparatus comprises a bottle rest configured to rest on a portion of a bottle placed within the bottle opener, a lower body collar attached to the bottle rest, an upper body collar slidably connected to the lower body collar, one or more levers attached to the upper body collar and to the lower body collar, the one or more levers configured to remove a bottle cap from the bottle and eject the bottle cap into the air when the upper collar slides relative to the inner collar in an ejection movement, one or more sensors configured to collect data when the bottle is placed within the inner collar, and a transmitter configured to transmit the collected data to an external receiver.

In some implementations, the levers are fixedly attached to the upper body collar at one end and slidably attached to the lower body collar near a second end. An upper handle is attached to the upper body collar and a lower handle attached to the lower body collar. The upper handle is pivotably attached to the lower handle. The upper handle is configured to pivotably rotate with respect to the lower handle and thereby slide the upper body collar with respect to the lower body collar. The levers are configured to eject the bottle cap into the air straight from the bottle opener or at an angle.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 6A is a schematic implementation of the bottle opener integrated on a keychain.

FIG. 6B is a schematic of the inner components of the bottle opener integrated on the keychain of FIG. 6A.

Like reference symbols in the various drawings indicate like elements.

DETAILED DESCRIPTION

Figure 1:
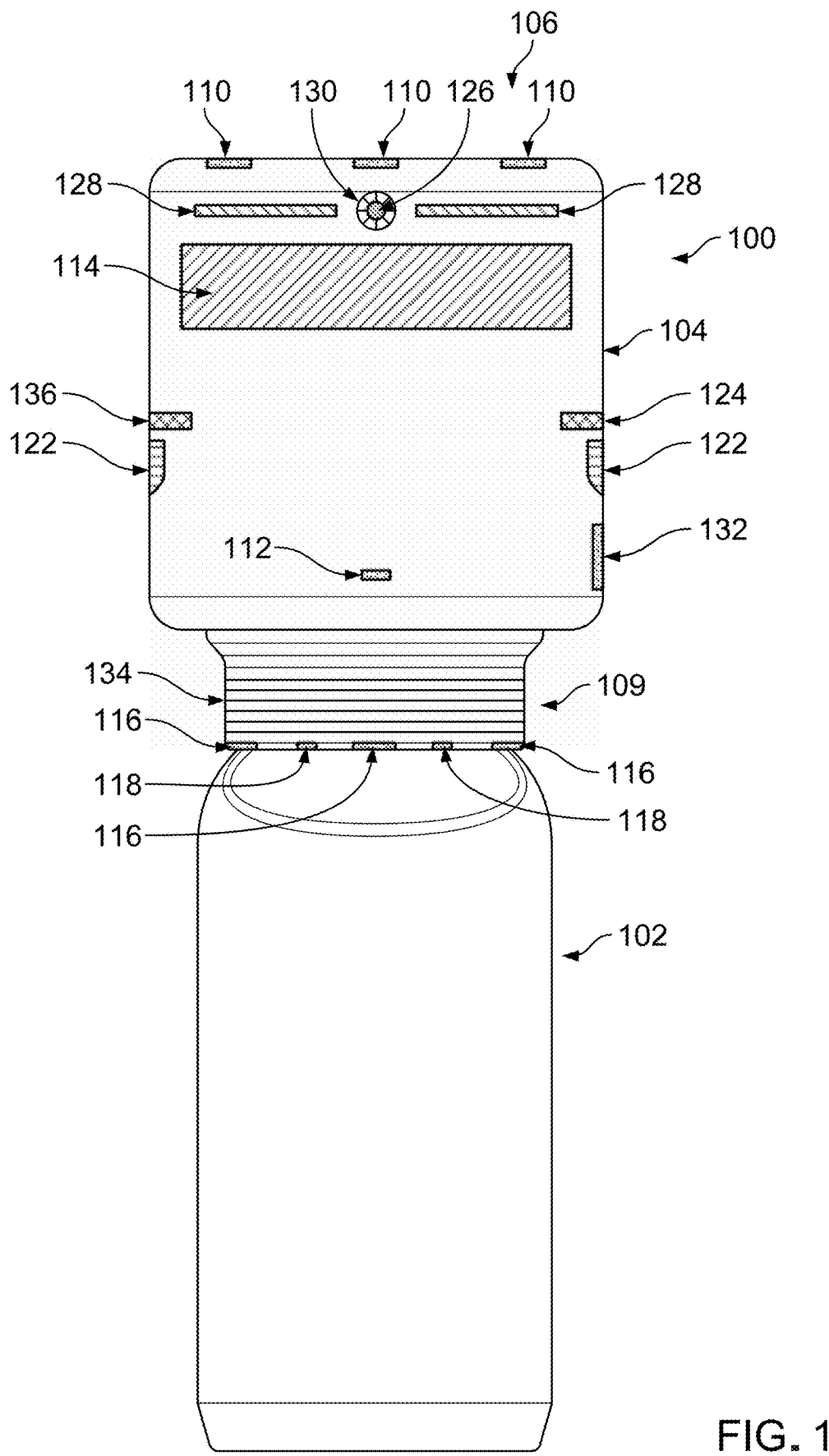
FIG. 1 is a schematic of a bottle opener positioned on a top portion of a bottle.

Referring to FIG. 1, a bottle opener 100 is an apparatus that improves the user experience of opening a bottle by enabling the cap of the bottle to be ejected into the air. The bottle opener 100 is mounted on top of a container such as a beer, soda, champagne or wine bottle and is able to fit on various size bottles due to its adjustability. Levers inside the bottle opener 100 attach to the bottle's cap, and a user pulling down an outer surface 104 of the bottle opener 100 causes the bottle cap to be removed from the bottle and ejected into the air.

In FIG. 1 the bottle cap is hidden from view as it is inside the bottle opener 100 while the bottle opener 100 is positioned on a bottle 102. The bottle opener 100 is at rest on top of the bottle 102. The outer surface of the bottle opener 104 is largely smooth, which allows for brand advertising. The outer surface 104 of the bottle opener 100 can also have a grip surface for right handed and/or left handed people (e.g., an ergonomically shaped grip surface). The outer surface 104 can be made up from various different materials and combinations of different materials for example, steel, titanium, copper, gold, rubber, etc. The outer surface 104 of opener can be various shapes and sizes, and in one embodiment the outer surface 104 can be 1 to 6 inches tall, 1 to 4 inches wide in diameter, and cylindrical in shape.

An opening 106 at the top of the bottle opener 100 allows for the bottle opener 100 to eject the bottle cap into the air. The bottle opener 100 has an inner body collar 200 (shown in FIG. 2) that rests on the bottle 102 itself. The bottom portion 109 of the bottle opener 100 may include one or more scanners 116 and temperature sensors 118. The scanners 116, which can include an optical scanner, can identify the brand of the beverage inside bottle 102 and with help from a global positioning system (GPS) receiver 214 (shown in FIG. 2), collect data of the geographical location of the bottle 102 when it is being opened by the bottle opener 100. The temperature sensor 118 measures the temperature of the bottle 102 while it is in contact with, and while it is being opened by, the bottle opener 100.

The bottle opener 100 allows the end user to look forward to the act of opening the bottle and an eventual next bottle. The bottle opener 100 can be waterproof, heatproof, and coldproof. It can be durable to withstand falls and other hazardous situations. In some cases, the bottle opener 100 can support a lighter mechanism for starting a fire with various chemical reactions.

As shown in FIG. 1, the bottle opener 100 includes a display 114 that can be a light emitting diode (LED)/liquid crystal display (LCD) or another form of light emitting diode such as Indium Tin Oxide, OLED, nanotubes, and/or nanobuds.

Electronic paper could be used as the display 114, as a light-emitting screen that can display live animated advertisements from companies and other messages. Various other technologies of display could be used as well for the display 114. The display 114 can be bendable, as are displays of some televisions and cell phones. A middle portion of the display could be fastened and secured to the outer surface 104 of the opener 100 while the other parts of the display 114 could detach from the outer surface 104 (e.g. unfold from the middle portion and spread out) to be made into a flat screen. This multifunctional display 114 could allow users to see a bigger picture.

A wireless transmitter 112 allows data to be collected and stored in a central memory within the bottle opener 100, allowing data to be collected and then transmitted, e.g., to inform various beverage producers and brands of various data. Data could also be sent to a computer network with the help of the wireless transmitter 112. Nanotechnology and quantum chips could be used to improve the technology on the bottle opener 100 as computing power is more efficiently scaled to fit the bottle opener structure. Artificial intelligence could also be implemented with a central processing unit (CPU) so that the technology of the bottle opener 100 can naturally evolve and be automatically updated with the latest software/other technological advances.

The bottle opener 100 can also be configured to communicate wirelessly via the wireless transmitter 112 with other devices such as, laptops, smartphones, tablets etc. This communication allows for orders to be made between various other devices at one time, for example, by inputting a certain code so that an end user can redeem rewards as well as receive updates while in range of a wireless signal. Also, brands can send, with the permission of in-range patrons, invitations to sign up for email updates of the brand and also identify the establishment or business that the patron is visiting at the time, including a private residence. The wireless transmitter 112 can exchange information and data on and off of the opener 100 through Wi-Fi, Bluetooth, cellular or other various frequencies.

On the sides of the bottle opener 100 are one, two, three or more air purification slots 122 that offers an air purification/deodorizer system that makes the surrounding area more pleasant in smell. Sound speakers 124 can be located right above the air purification/deodorizer system 122. The sound speakers can provide sound for advertisements, can be turned on or off, and can play programmable sound effects when the bottle opener 100 is ejecting a bottle cap. Sound effects can come from advertisers, brands, sports teams, etc. The sound speakers 124 could be used for various other purposes. Buttons to control this feature could be added to the bottle opener 100.

A microphone 126 is voice activated and can be located above the display 114, allowing end users to control the bottle opener 100 and its various functions with voice commands. There can be one, two, three or more microphones 126. Buttons to control this feature could be added to the bottle opener 100.

A geo mapping technology 128 maps and scans the area surrounding the bottle opener 100 to detect the number of people that are in proximity when the product is opened. With the implementation of an infrared scanner, the bottle opener can measure the body temps of surrounding people and use that information for brands. Face recognition scanners can also help in detecting people by using spatial geometry software in order to identify facial features.

The geomapping technology 128 can implement a wireframe model method of three dimensional subsurface mapping commonly employed for the preparation of digital elevation models in surveying, hydrology, geology, and mining. The wireframe model maps a set of points having known triaxial (x,y,z) Cartesian coordinates. Prior to plotting, a gridding routine is used to place randomly located field data in a regular grid with spacing selected by the drafter. Wireframe plotting results in an open (x,y) grid with the height of each grid node corresponding to the z coordinate at that point. The wireframe model has a number of advantages over other 3D modeling methods. These include simplicity of presentation, flexibility in the use of color, and high impact value as a presentation tool. To use the technology so that the bottle opener can collect the necessary data of the surrounding area, cameras along with optical scanners would survey the area and based on those images, and a digital wireframe of the surrounding area would be composed. These scanning technologies working together could make it possible to detect clothing brands, presence of machines, whether the end user is outside or inside when opening bottle, etc. The geomapping technology 128 can use sonar, for which there are various examples of mini devices available. Ultrasonic echo-location is used to detect objects. The device vibrates to indicate the distance to objects where the faster the vibration rate, the nearer the object. The settings as to how far objects are, comes with this device. With the use of sonar, digital wireframes, cameras and optical scanners, the geo mapping technology 128 could have a comprehensive understanding of the surrounding areas as a bottle 102 is opened. This information may be transmitted to various beverage brands via the wireless transmitter 112 to help them get a clearer picture of the types of environments in which their product is typically being used. Information produced can include a size of the surrounding area, whether it is an indoor or outdoor location, and a time of day recorded when the bottle opener 100 is used to open a bottle.

The geo mapping technology 128 could utilize sonar and emit high frequency pulses in order to be able to accurately detail the surrounding area. The geo mapping technology 128 could also utilize digital wireframes of the surrounding area that could measure the size of surrounding area, including buildings, outdoor areas and other standing structures inside and outside. The sound speakers 124 along with a camera 136, could help the geo mapping technology 128 determine its surroundings. The camera 136 (which could be one, two, three or more cameras) could capture images and determine what the objects are internally, process them, push the images to a remote site, and/or store them. The camera 136 could have night vision and other heat sensing technologies to determine the difference between people, animals, cars, walls, and other objects that give off heat. This feature is for the purpose of letting brands know how many people or potential customers are around their product when it is opened. If the bottle opener 100 can grab the attention of these people, then future revenue is possible. Augmented reality technology could improve the functionality of the geo mapping technology 128 and also leave virtual messages for other smart devices. Augmented reality adds graphics, sounds, haptic feedback and smell to the real world. The bottle opener 100 could provide businesses a way to engage their customers by providing virtual coupons on the street, or providing messages that encourage patrons to visit their establishment. The patrons would be at home and would be able to still engage with a business by seeing, engaging, and/or retrieving different objects from their phone, such as is available in popular cellphone-based games. This interaction could be interactive or informational. Augmented reality provides end users a more engaging experience for businesses. Augmented reality can also incorporate the sound features that the bottle opener 100 comes with. Adding sound effects to the opening of bottles is a form of augmented reality. Buttons to control this feature could be added to the bottle opener 100. The device can also store the collected data for brands to better understand how the consumption of their products, affect various age groups, genders, etc. of people.

The bottle opener 100 can also include a breathalyzer 130 that is located near the microphone 126, which can allow detection of a blood alcohol level of a user by normal speech. Breath analyzers may further be used to quickly identify a slew of other disorders, including cancer, leading to early detection and treatment. Buttons to control this feature could be included on the bottle opener 100.

A fingerprint scanner 132 scans fingers for identification if requested. This feature could also detect heart rate, blood pressure, and other health related items. The fingerprint scanner 132 could be located near the bottom of the outer surface 104 of bottle opener 100 and could also be at one, two, three or more other locations on the bottle opener. Buttons to control this feature could be included on the bottle opener 100.

Temperature bands 134 located on the bottom 109 of the bottle opener 100 act as a temperature maintenance tool that is removable from the bottle opener 100 and made of replaceable elastic, durable rubber, metal or other material. The temperature bands 134 are thin rings that expand to adjust to the size of the base of the bottle 102. An example would be a stretchable rubber material including an embedded metallic material (e.g., copper coil) that could help regulate the temperature of the liquid inside of the bottle while still being elastic. When the temperature band 134 is removed from the bottle opener 100, it is instantly activated and helps retain the cool temperature when placed on a bottle. By removing one of the temperature bands 134, the user can place the temperature band 134 onto the base of the bottle 102 before and during consumption of the liquid in the bottle. The temperature bands 134 are not cold on the exterior nor cold to the user's skin. The temperature bands 134 could have sensors to detect temperatures.

The temperature bands 134 could also provide a light show inside of the bottle that looks like live animations, laser shows, and even advertisements being incorporated for brands. Buttons to control this feature could be added to the bottle opener 100. The temperature bands 134 would be able to work on various materials such as, glass, plastic, ceramic, as well as others, including various shapes of glasses and mugs. Other forms and shapes of the temperature bands 134 could be developed where, in addition to bands, there could be disposable stickers that could be placed on a bottle and activated once placed. These stickers would have the same technology as the temperature bands 134. Both the stickers and the temperature bands could work, independently or cooperatively, with the bottle opener 100 after authorization with a certain code if purchased separately from the bottle opener 100.

On the bottom and inside of the opener 100 (e.g., near a top of the bottle 102 where the cap is before ejection), a scanner 116 can be included that can scan the shape and/or logo of a bottle cap, and the barcode of the bottle being consumed by the end user. This feature will be especially important for brands who would like to better understand their consumers. This data will be tabulated and stored, allowing brands to receive a plethora of information, such as where geographically their consumers opened and consumed their bottles. This could be possible with the use of the GPS receiver 214. Brands can also learn how soon after purchase their products are being consumed by having the bottle cap popped off and scanned.

The technology on this opener can also connect with other appliances in homes or businesses that have temperature controlled features, such as a refrigerator.

The operation of opening a bottle and scanning the bottle cap can be combined in a single action. The scanner 116 scans the bottle cap logo and/or other brand identification features that are scannable while sitting on top of the bottle. In some cases, the bottle 102 without a cap fastened to it cannot be scanned. The action of the bottle opener actually opening and popping off the cap in conjunction with the scanner, can, in some cases, be necessary for the scanning to fully function properly.

How many bottles are being purchased and consumed by an end user would be useful information to brands, as would determining on what days the end user is more likely to open and consume their bottles. Brands could offer specials accordingly. Other information could include if the beverage was consumed at a residence or park or at an event, how far away from their purchase the beverage was consumed, the temperature at which customers are consuming the product, etc. For the end user, by scanning their products they are allowing brands to better understand their interest in their product and can be rewarded with offers and bonuses for scanning a certain amount of that brand's product, such as sales or promotions. This bottle opener 100 offers both brands and end users a technological advantage over the market. The satisfaction of ejecting a bottle cap off of a bottle, the ability to scan and receive loyalty rewards as a customer, and the collection of data for the purpose of increasing the efficiency of marketing and promotion for brands, makes this device a game changer for this industry.

In some implementations, the bottle opener 100 can include a safety stopper that controls the ejection of the bottle cap while still allowing for the popping sound to take place. The safety stopper can include a hood, an enclosure, or another stopping device that extends over the opening 106 at the top of the bottle opener 100 to control the ejection of the bottle cap by blocking, catching, redirecting, or otherwise preventing the upward travel of the bottle cap. For example, the safety stopper can include a concave or convex hood, net, or other part that extends over the opening 106 and redirects the ejected bottle cap downward or in another direction that enhances user safety. While the safety stopper can prevent the upward travel of the bottle cap, the sound produced from ejecting the bottle cap can remain substantially unaffected. In some implementations, the safety stopper can be removably attached to the bottle opener 100. In other implementations, the safety stopper can slide or fold into or around the bottle opener 100 to allow a user to optionally deploy the safety stopper. Deployment and retraction of the safety stopper can be manual or automatic (e.g., via a button added to the bottle opener 100, in response to ejection of the bottle cap, etc.). Furthermore, the height of the safety stopper can be adjustable to allow the user to control the distance between the opening 106 and the stopper. In some cases, the stopper can include a magnetic material, a suction device, and/or another mechanism to catch the bottle cap as it is ejected. Once captured, the bottle cap can be disposed of by ejecting it from the safety stopper (e.g., via an ejection mechanism coupled with the safety stopper, by retracting the safety stopper, etc.). In some implementations, the safety stopper can store the bottle cap in a compartment within the bottle opener 100 for later disposal. In one example, the safety slider could slide the bottle cap into an internal collection area within the inner body collar that could store one or more bottle caps and release them in an organized (e.g., stacked) or disorganized arrangement.

In some implementations, the bottle opener 100 can include a conventional bottle opener (not shown). The conventional bottle opener can be fixedly or removably attached to any part of the bottle opener 100 including, for example, the outer surface 104 or the bottom portion 109. The bottle opener 100 can also include other accessories such as sparklers or confetti configured to deploy upon user interaction and/or ejection of the bottle cap.

In some implementations, the bottle opener 100 can be attached to another device, such as a vehicle, an appliance, a smartphone, a tool, or a machine, among others. Furthermore, in some implementations, multiple bottle openers 100 can be combined to create a multiple bottle opener device, such as multiple bottle opener 1100 as described with reference to FIGS. 11 and 12.

Figure 2:
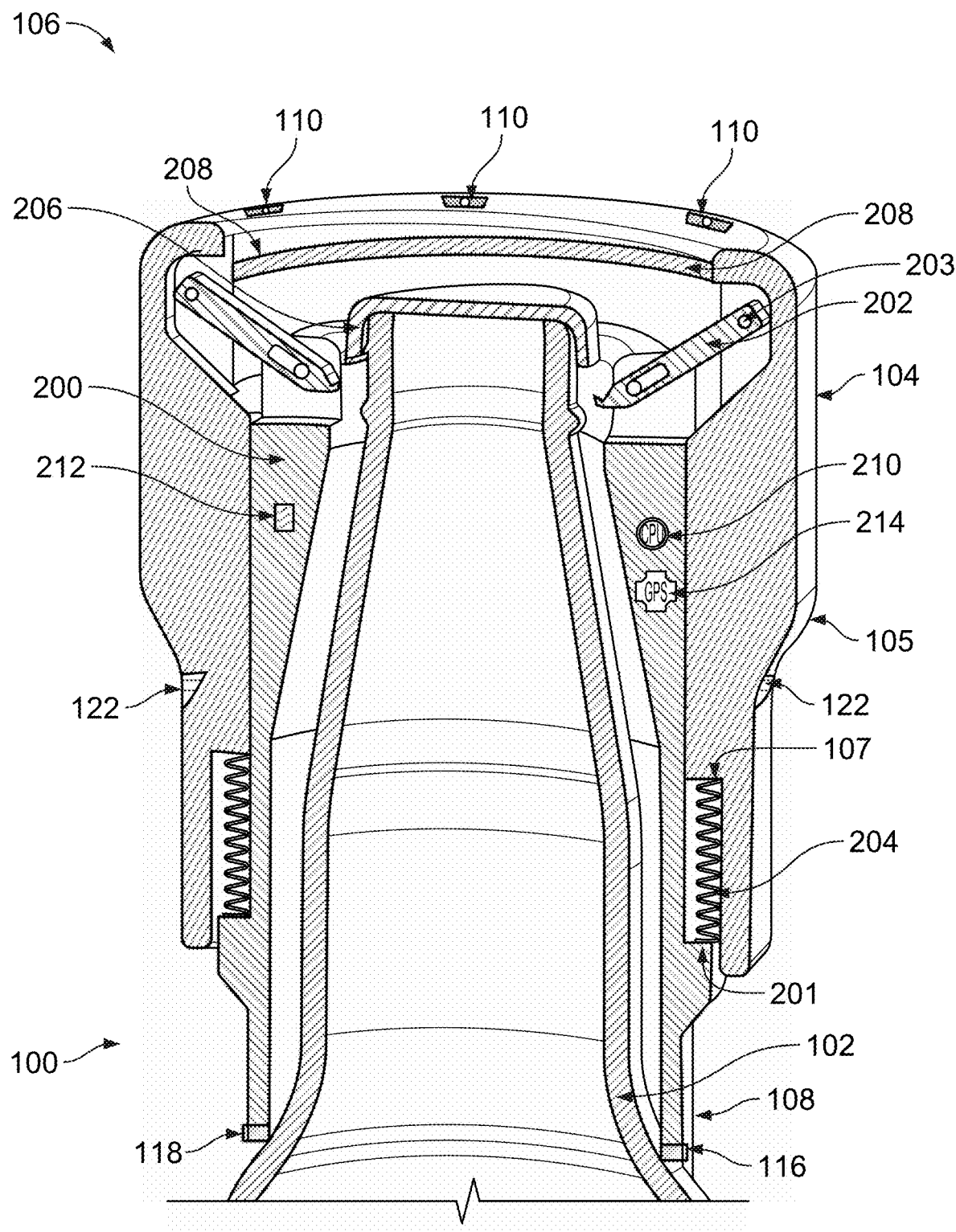
FIG. 2 is a schematic showing the inner components of the bottle opener of FIG. 1, including an inner body collar and an outer body collar.

FIG. 2 shows the inside mechanical workings of the bottle opener 100 and its components. The bottle 102 is inside the bottle opener 100 and the cap 206 is still connected to the bottle 102. The outer surface 104 of the outer body collar 105 is smooth so brands can print their logos on the surface. The outer body collar 105 is slidable relative to the inner body collar 200. The opening of the bottle opener 106 allows for the cap to be ejected into the air. The bottom portion 108 of the inner body collar 200 of the opener is what contacts the bottle 102.

A wireless transmitter 212 can be implanted into the inner body collar 200 of the bottle opener 100. A scanner 208 can be infrared or optical based. The scanner 208 can also be passive or active in detecting the brand of bottle and the cap. A light source can automatically shine a light or flash when not enough ambient light is provided.

The scanner 208 is located on the inside of the outer body collar 105, and scans and identifies the brand shown on the bottle cap 206 and sends the data to a database as well as the CPU 210 implanted inside of the inner body collar 200. The CPU 210 or computing device could be more than one chip. The CPU 210 could collect and aid the wireless data exchange from the wireless transmitter 212 which can both send and receive data. The CPU 210 along with the wireless transmitter 212 and other necessary technology could make it possible for customers to sign into a bottle opener from their phone and send the geographical data of where a product was opened and consumed with the help of a GPS receiver 214. That corresponding data would be collected and the user could be able to play music and sign up for various offers from the establishment or business that user is currently at, using the bottle opener 100. In addition, advertisers could send that user offers, games to play, contests, etc. Games could be uploaded by businesses or brands for users to play by themselves or against other patrons to win prizes. Future reservations could be made directly through bottle opener 100 for easier use. Patrons could also communicate with other patrons, through their respective bottle openers by sending a message request, for example "Message request from table one." This offers a discreet way for patrons to communicate with each other.

The temperature sensors 118 can include a temperature heating source that helps maintains the temperature of the bottle. The temperature sensors 118 can incorporate lasers or other sensor technology and can be located on the most bottom portion of the bottler opener 100, contacting the bottle 102. Laser pulse heating of liquid particles can kill pathogenic bacteria and cancer cells. The temperature sensors 118 with the use of the wireless transmitter 212 can communicate with various appliances to help regulate the necessary temperatures desired by user. This data can also be collected and sent to brands for the purpose of knowing their customers' desired temperature for consuming their product.

The CPU 210 collects the data that is being scanned and is able to send that data wirelessly through the wireless transmitter 212 to the necessary databases for brands. Air purification vents 122 are located in the middle of the bottle opener 100, such as very discreetly under the display 114 (shown in FIG. 1).

The inner body collar 200 is inside of the outer body collar 105 that includes the outer surface 104 of the bottle opener. This inner body collar 200 works in conjunction with the outer body collar 105 by sharing a space cavity that houses springs 204 (or another type of compression device). The springs 204 rest on a projection 201 of the inner body collar 200 at one end and at a projection 107 of the outer body collar 105 at the other end. When the outer body collar 105 is pulled downwards, the projection 107 of the outer body collar 105 exerts force on the springs 204, compressing them against the projection 201 of the inner body collar 200. Pulling down the outer body collar 105 also causes levers 202 to pivot around articulation points 203 (e.g., rotatable pins) and the levers 202 pivot upwards (ejecting bottle cap 206 off of the bottle 102 as shown in FIG. 3).

In FIG. 2 the springs 204 are in an uncompressed state. The levers 202 can be one, two, three or more in quantity. The levers 202 can be made of a metallic, plastic, or other materials necessary for ejecting the bottle cap 206. The bottle opener 100 can eject the bottle cap 206 with a lever mechanism and/or by other methods necessary for ejecting the bottle cap 206, such as by twisting the bottle cap 206, sliding the bottle cap 206 vertically, horizontally, or in another direction, applying a magnetic force to the cap, or applying pressure to the bottle 102, to the bottle cap 206, and/or to the liquid inside the bottle 102 (e.g., by laser technology). While the levers 202 are shown to pivot about articulation points 203, it is understood that in alternative implementations, the axis of rotation can be anywhere along the length of the levers 202. In some implementations, the levers may not rotate at all and may act as a fixed lifting claw. In some implementations, the mechanism used to eject the bottle cap 206 can be selected based on the type of bottle cap 206 (e.g., if the bottle cap 206 is a twist-off cap, a twisting mechanism can be employed to eject the cap). In general, however, the bottle opener 100 can be configured to open any type of bottle cap 206 including, but not limited to, a crown cap, a twist-off cap, a cork, another closure mechanism, or any combination thereof.

Figure 3:
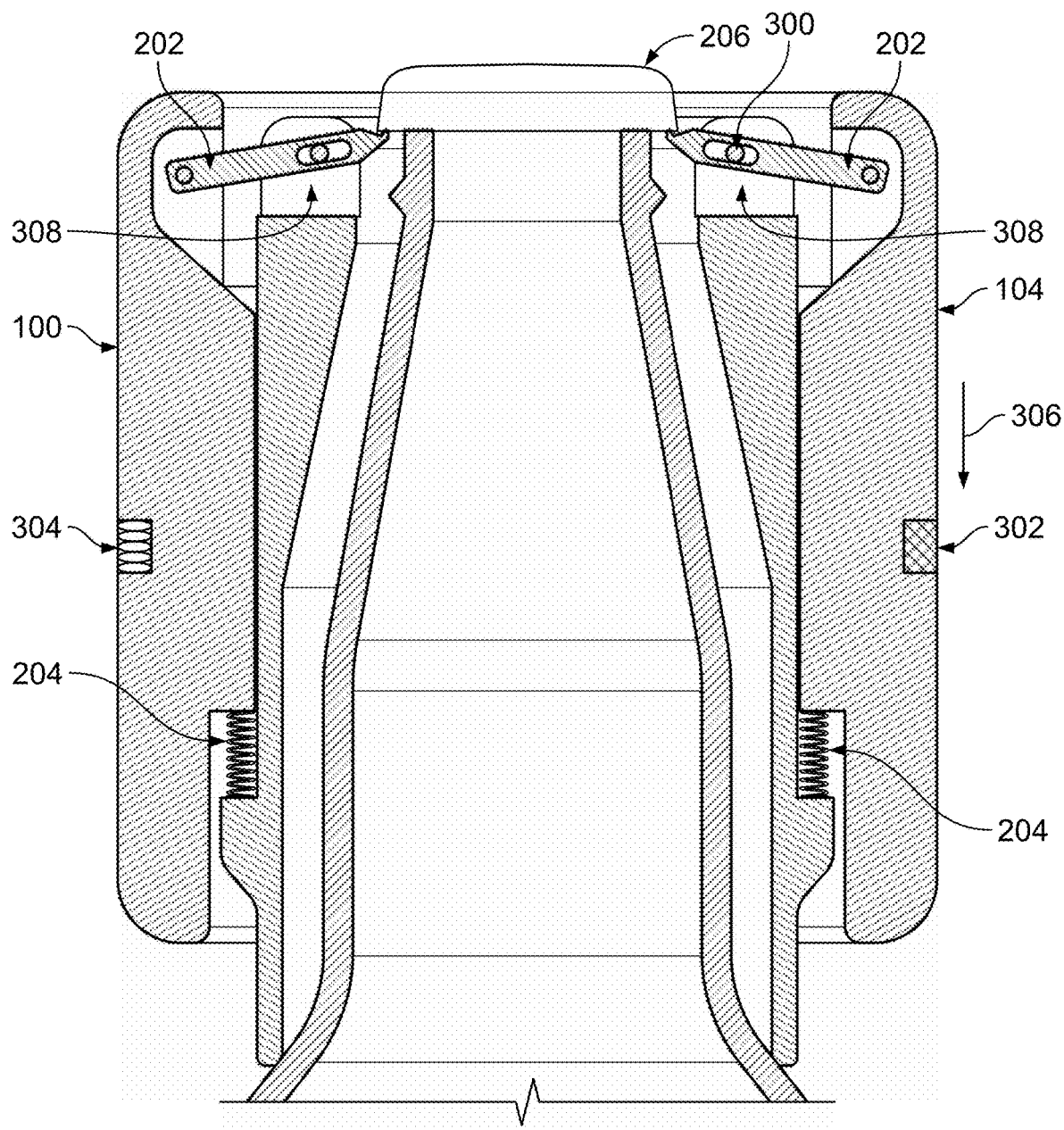
FIG. 3 is a schematic of a cross-section of the bottle opener with levers that are engaged with a bottle top and springs that are in a most compressed state.
Figure 4:
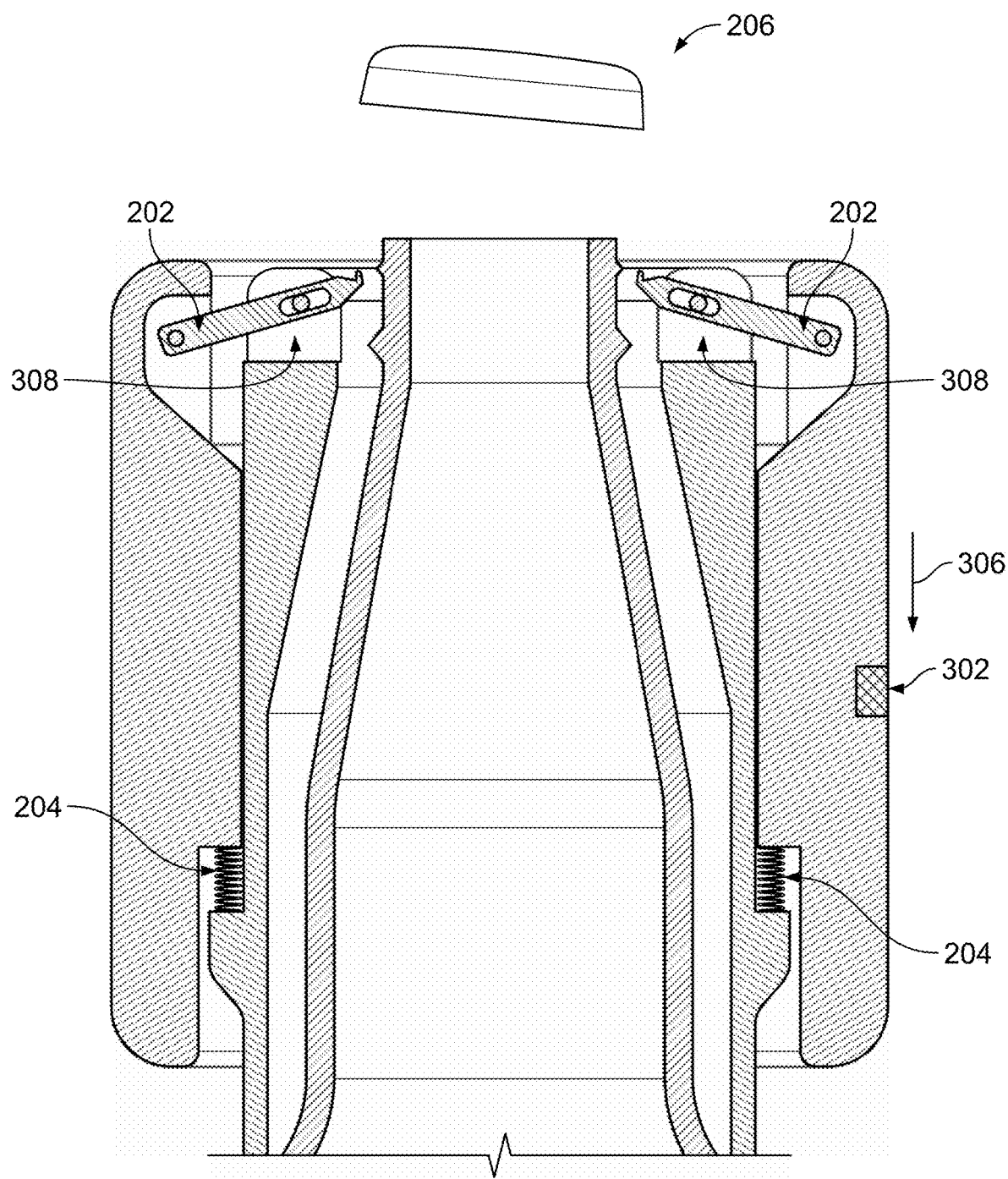
FIG. 4 is a schematic of a cross-section of the bottle opener ejecting a cap of a bottle with the springs in close to their most compressed state.

FIG. 3 shows the mechanical functionality of the bottle opener 100 as it is pulled down in the direction of arrow 306. The levers 202 pivot upwards in direction of arrow 308 around articulation points 203 and contact the bottle cap 206 right under its rim. The end of the levers 202 that contact the bottle cap 206 can have a hook, or curved portion as shown, so as to better fit under the bottle cap 206, or fit between the bottle cap 206 and the bottle 102. Pulling down the outer surface 104 of the bottle opener in the direction of the arrow 306 enough so that the springs 204 are in their most compressed state provides enough force to the levers 202 for an ejectment movement and for the bottle cap 206 to be ejected into the air (FIG. 4). The levers 202 have a slot 301 that houses one, two, or more pins 300 that allow the lever 202 to pivot upwards in direction 308 and return to its resting point after ejecting the bottle cap 206.

The bottle opener 100 can be adjustable so that it can open champagne and wine bottles as well as beer and soda bottles. Chargeable batteries 304 are located within the outer surface 104 of the bottle opener. The bottle opener 100 alternatively can be plugged into a charger and the batteries can be replaced if necessary after a period of time. Solar/light charging capabilities are also possible. Magnetic material inside of bottle opener allows for various uses, e.g., allowing the bottle opener to adhere to a refrigerator or other metallic surfaces.

FIG. 4 shows the mechanical functionality of the bottle opener 100 as the bottle cap 206 is ejected. The springs 204 are fully or close to fully compressed. The levers 202 are pointing upwards. The ejection of the bottle cap 206 is done at a speed that allows it to propel approximately 3 to 5 feet or more in the air. In some implementations, the bottle opener 100 can enable the user to control the ejection speed and height of the bottle cap 206. For example, the bottle opener 100 can include one or more buttons or switches which allow the user to set a desired ejection speed and/or height. One or more stoppers or other mechanical devices in the bottle opener 100 can then set the maximum force applied to the bottle cap 206 by the levers 202 (e.g., by modulating the compression of the springs 204) based on the user input. In this manner, the user can set the ejection height of the bottle cap anywhere between 0 feet in the air (e.g., prying off the bottle cap 206) and 5 feet or more in the air. The springs 204 can be one, two, three or more in quantity. The force applied to each of the springs 204 can be identical or be varying in force applied to each of the springs 204 or varying in the amount of force applied to the cap by each lever 202. This can allow the cap to be ejected in a certain direction; either straight up in the air or in any possible direction according to how the springs 204 are applied and fixed in the bottle opener, or how the levers are applied and fixed in the bottle opener. For example, the springs 204 can be equal in length and have the same potential energy storage. The springs 204 can be different lengths and have the same potential energy storage. The springs 204 can be different lengths and have different potential energy storage. The levers 202 can be at attached at different angles or be longer or shorter than each other and thus have differing lever arms and provide differing amounts of force to the bottle cap 206.

During the ejecting of the bottle cap 206, programmable sound effects can be implemented into the bottle opener 100 and played via the speakers 302. Sound effects can be turned on or off.

Figure 5:
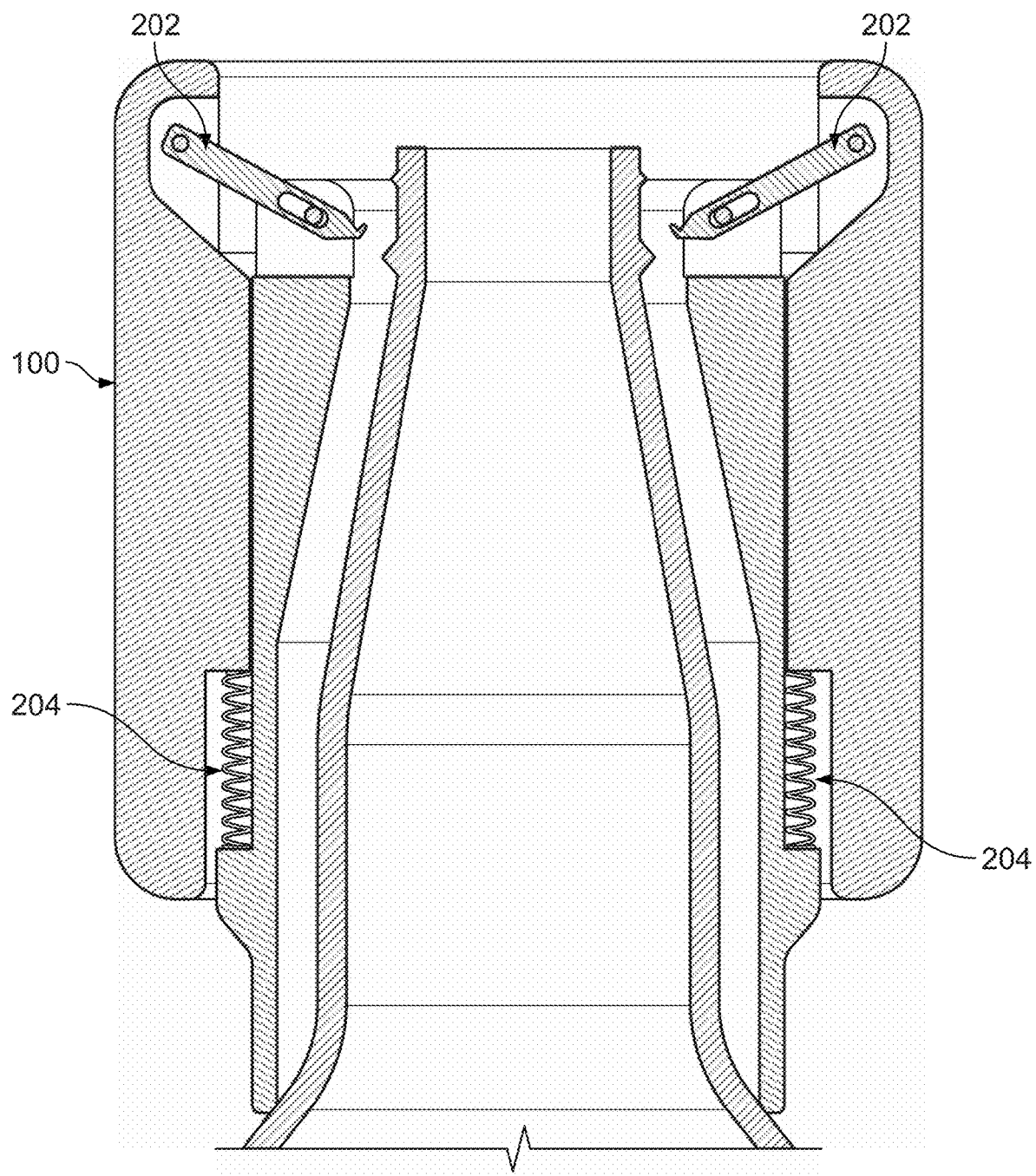
FIG. 5 is a schematic of a cross-section of the bottle opener after the bottle cap has been ejected and the springs are uncompressed.

FIG. 5 shows the bottle opener 100 returning to its resting state with springs 204 uncompressed after the bottle cap 206 has been ejected and the springs 204 have been released of their tension. The levers 202 have returned to their resting position, with the single or possible double or more pins 300 sliding inside the slots 301 to accommodate the up and down motion of the levers 202 as they are pulled by outer body collar 105.

FIG. 6 is a keychain version of bottle opener 600. A graphical arrow 626 is shown as the direction the bottle opener 600 needs to be pulled for it to function. When pulling on the two finger slots 610, the user would compress the spring 612, so that lifting claws 616 can eject the bottle cap off of the bottle. The lifting claws 616 could be a lever or some other mechanical tool that allows for the function to take place. A round metal piece that the lifting claws 616 are part of, has collapsible joints 644 that are compressed along with the spring 612. The collapsible joints 644 houses bendable metals rods 646 that run inside the entire bottle opener 600 so that it can lessen the diameter of the round metal piece 614 once the round metal piece 614 is round the bottle neck. The bendable metal rods 646 could be made out of other various materials. Once the bottle cap is ejected, the spring 612 is decompressed.

The round metal piece 614 returns to its normal round shape to allow for another bottleneck to be placed inside of it. A lighter feature can be included as described earlier for the ability to produce fire via a chemical reaction. An advertisement area 604 on the bottle opener 600 allows brands to put their logos on the bottle opener 600. The advertisement area 604 can have messages, logos, advertisements, messages, etc. on this portion of the bottle opener 600. Scanners 606 are located in one or more locations on the bottle opener 600. The scanners 606 function in the same manner as the scanners 116 described earlier with respect to FIG. 1. The scanners 606 could be moved to other areas of the bottle opener 600 and be placed in a downward angle for when the bottle is entering the round metal piece 614. The round metal piece 614 could assist the function of ejecting the bottle cap off of the bottle. The round metal piece 614 could also be claw shaped or other various shapes and made out of other various materials. The display 602 is located next to the spring 612. The display 602 functions in the same manner as the display 114 described earlier with respect to FIG. 1. A geo mapping technology 636 tool is located above the display 602 or can be located in other places. The geo mapping technology 636 functions in the same manner as the geo mapping technology 128 described earlier with respect to FIG. 1.

The temperature sensors 618 are positioned inside of the round metal piece 614. The temperature sensors 618 functions in the same manner as the temperature sensors 118 described earlier with respect to FIG. 1. The microphone 632 is located inside of the breathalyzer 634 on the side of the bottle opener 600. The microphone 632 and the breathalyzer 634 functions in the same manner as the microphone 126 and the breathalyzer 130 described earlier with respect to FIG. 1. The CPU 620 is located inside of the bottle opener 600 as well as the GPS receiver 622. The CPU 620 and the GPS receiver 622 function in the same manner as the CPU 210 and the GPS receiver 214 described earlier with respect to FIG. 2. The wireless transmitter 630 is located in the middle of the bottle opener 600. The wireless transmitter 630 functions in the same manner as the wireless transmitter 112 described earlier with respect to FIG. 1. The air purification system 628 is on the edge of the bottle opener 600 near the back. The air purification system 628 functions in the same manner as the air purification system 122 described earlier with respect to FIG. 1. Batteries 624 are close to the keychain section of the bottle opener 600. The batteries 624 function in the same manner as the batteries 304 described earlier with respect to FIG. 3. The keychain loop 638 for the bottle opener 600 to be attached to a set of keys is made out of metal or other various materials. The keychain loop 638 can be a single loop, double loop, or more loops and could be assisting the bottle opener 600. Sound speakers 642 located next to the batteries 624 and opposite the air purification system 628. The sound speakers 642 function in the same manner as the sound speakers 124 described earlier with respect to FIG. 1. The bottle opener 600 at the side/inside view 640 shows the inner technology that allows the bottle opener 600 to function.

Figure 7:
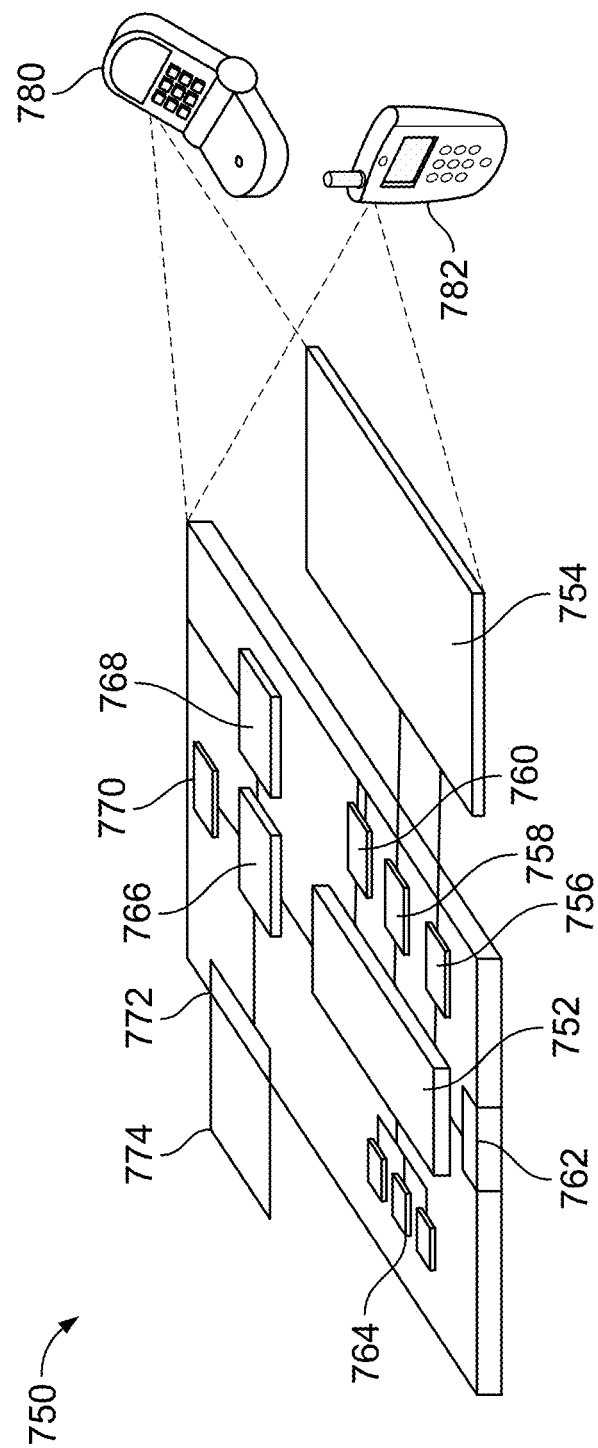
FIG. 7 is a schematic block diagram of computing devices.

Referring to FIG. 7, a block diagram of computing devices 750 that may be used to implement the systems and methods described in this document, as either a client or as a server or plurality of servers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can process instructions for execution within the computing device 750, including instructions stored in the memory 764. The processor may also include separate analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD display or an OLED display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with processor 752, so as to enable near area communication of device 750 with other devices. External interface 762 may provide, for example, for wired communication (e.g., via a docking procedure) or for wireless communication (e.g., via Bluetooth or other such technologies).

The memory 764 stores information within the computing device 750. In one implementation, the memory 764 is a computer-readable medium. In one implementation, the memory 764 is a volatile memory unit or units.

In another implementation, the memory 764 is a non-volatile memory unit or units. Expansion memory 774 may also be provided and connected to device 750 through expansion interface 772, which may include, for example, a SIMM card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS receiver module 770 may provide additional wireless data to device 750, which may be used as appropriate by applications running on device 750.

Device 750 may also communicate audibly using audio codec 660, which may receive spoken information from a user and convert it to usable digital information. Audio codex 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750. The computing device 750 may be implemented in a number of different forms, as shown in the figure. For example, it may be implemented as a cellular telephone 780. It may also be implemented as part of a smartphone 782, personal digital assistant, or other similar mobile device.

FIGS. 8, 9, 10A, 10B, and 10C illustrate a second embodiment of a bottle opener 800 that improves the user experience of opening a bottle by allowing the cap of the bottle to be ejected into the air. Levers inside the bottle opener 800 attach underneath the bottle's cap, and a user pressing down on a handle 804 of the bottle opener 800 causes the bottle cap to be removed from the bottle and ejected into the air.

The bottle opener 800 can include one or more of the features described above with respect to FIG. 1 and bottle opener 100, e.g., a display, scanners, temperature sensors, wireless transmitter, air purification slots, sound speakers, microphones, geo mapping technology, a breathalyzer, a fingerprint scanner, and/or a safety stopper, among others. The bottle opener 800 can be waterproof, heatproof, and coldproof. It can be durable to withstand falls and other hazardous situations.

Figure 8:
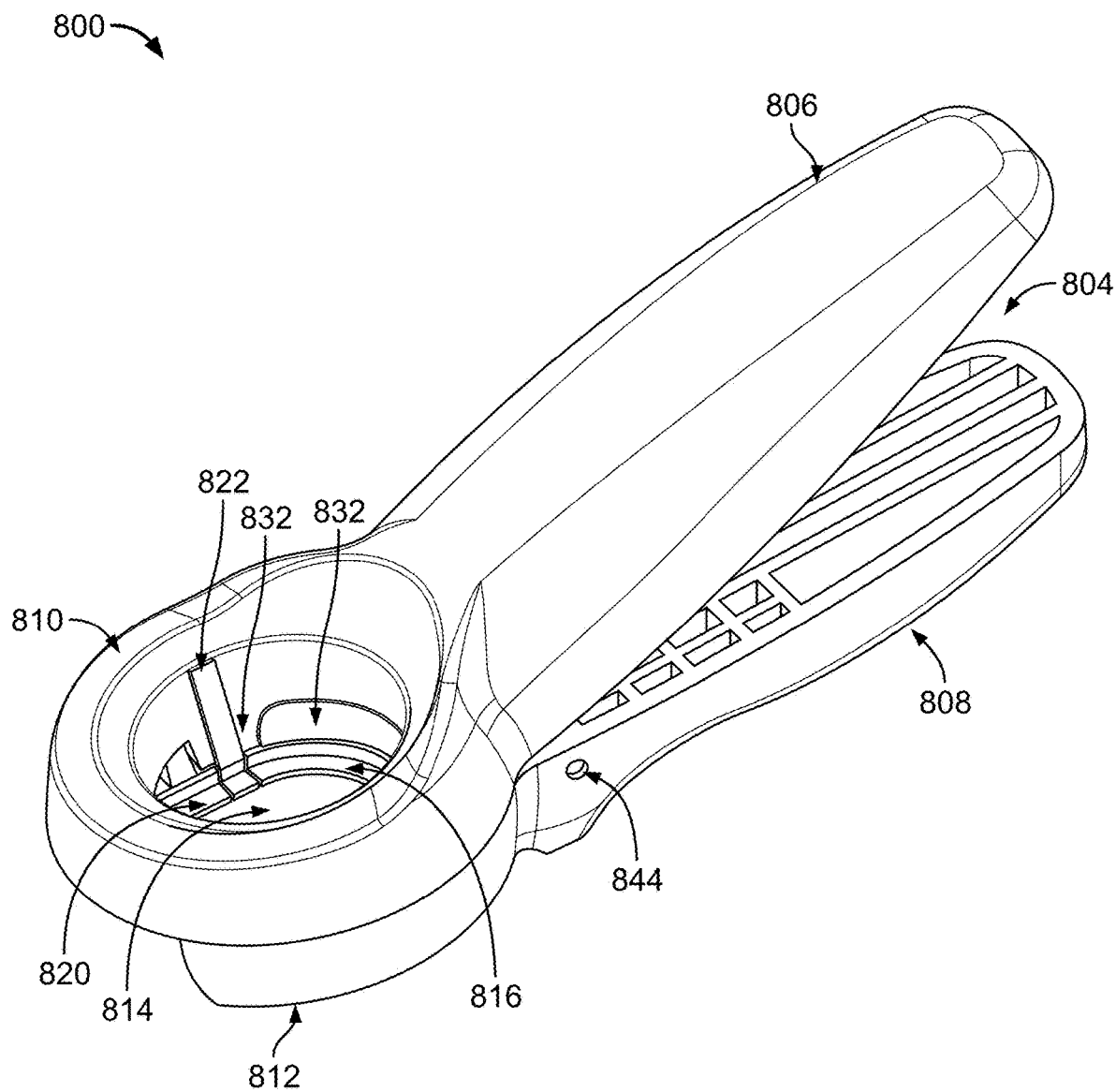
FIG. 8 is a schematic of a second embodiment of a bottle opener.
Figure 9:
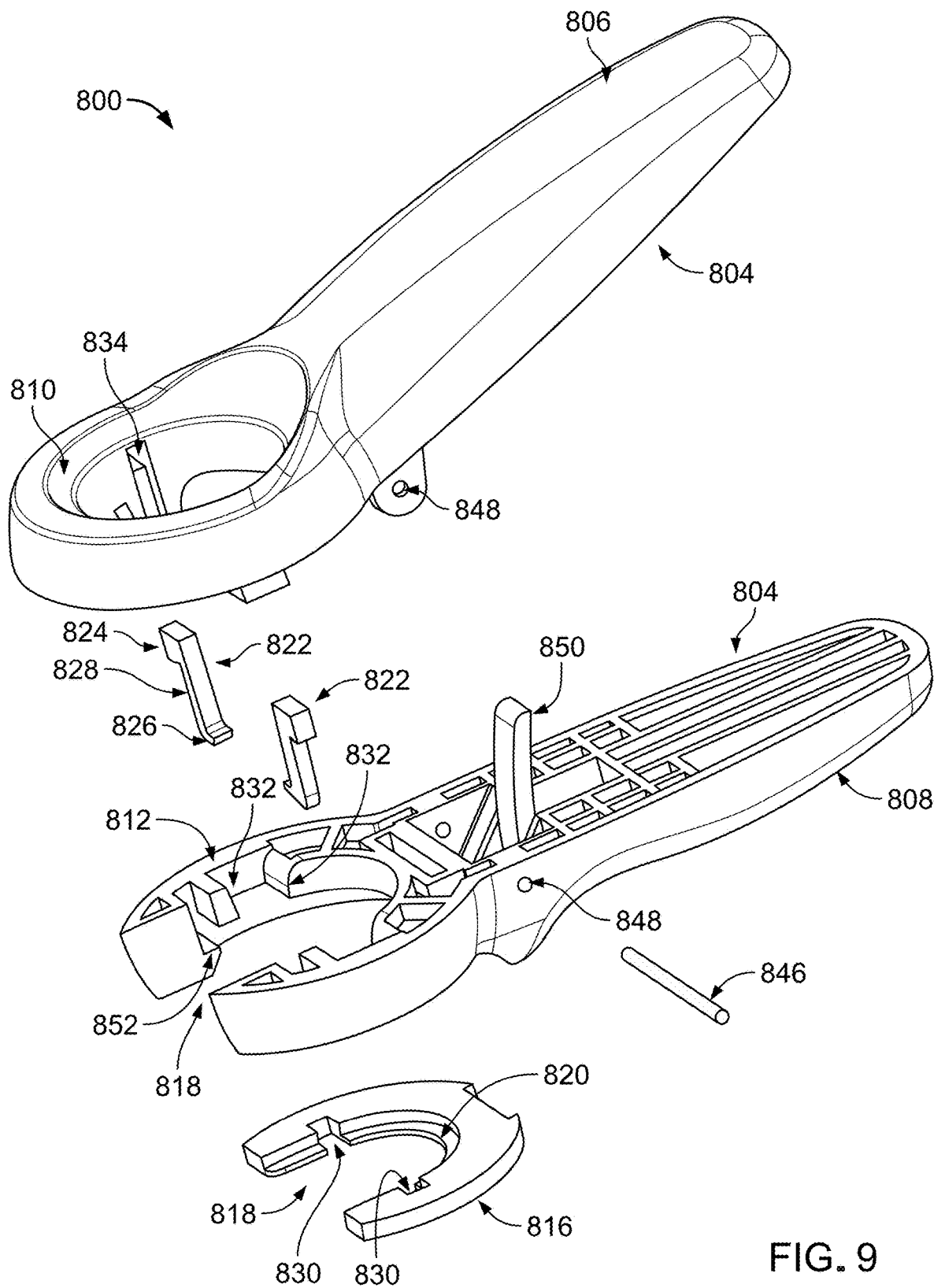
FIG. 9 is an exploded view of the bottle opener of FIG. 8.

FIGS. 8 and 9 show the mechanical workings of the bottle opener 800 and its components. In some implementations, the bottle opener 800 has a pivotable handle 804 that creates the action of removing a bottle cap from a bottle. In other implementations, the bottle opener 800 includes a fixed handle with a trigger mechanism that creates the action of removing the bottle cap from the bottle. The pivotable handle 804 has two portions, including an upper handle 806 and a lower handle 808. The upper handle 806 can pivot with respect to the lower handle 808, or vice versa. The top surface of the upper handle 806 is smooth so that brands can print their logos on the handle surface. An upper body collar 810 is attached to the upper handle 806 and a lower body collar 812 is attached to the lower handle 808. In some cases, the upper body collar 810 may be considered an outer body collar and the lower body collar 812 may be considered an inner body collar. The upper body collar 810 is slidable relative to the lower body collar 812. Additionally, the lower body collar 812 is in contact with a bottle rest 816. The upper body collar 810 and the lower body collar 812 as well as the bottle rest 816 each has a central opening 814. When the upper body collar 810, lower body collar 812, and the bottle rest 816 are assembled, the central opening 814 allows for the bottle cap to be ejected into the air.

The upper body collar 810 is generally annular in shape while the lower body collar 812 and bottle rest 816 can each optionally include a gap 818 (best seen in FIG. 9 and partially in FIG. 10B), allowing a bottle top and bottle cap to be easily inserted in the bottle opener 800. While the gap 818 is shown at a front aspect of the bottle opener, it is understood that the gap can be at any portion of the lower body collar 812 and the bottle rest 816, or the gap may not be present at all.

In some implementations, the lower body collar 812 can be a standalone bottle opener. This would provide a single-action simplified technique of opening the bottle that can be performed with just one hand.

Figure 10A:
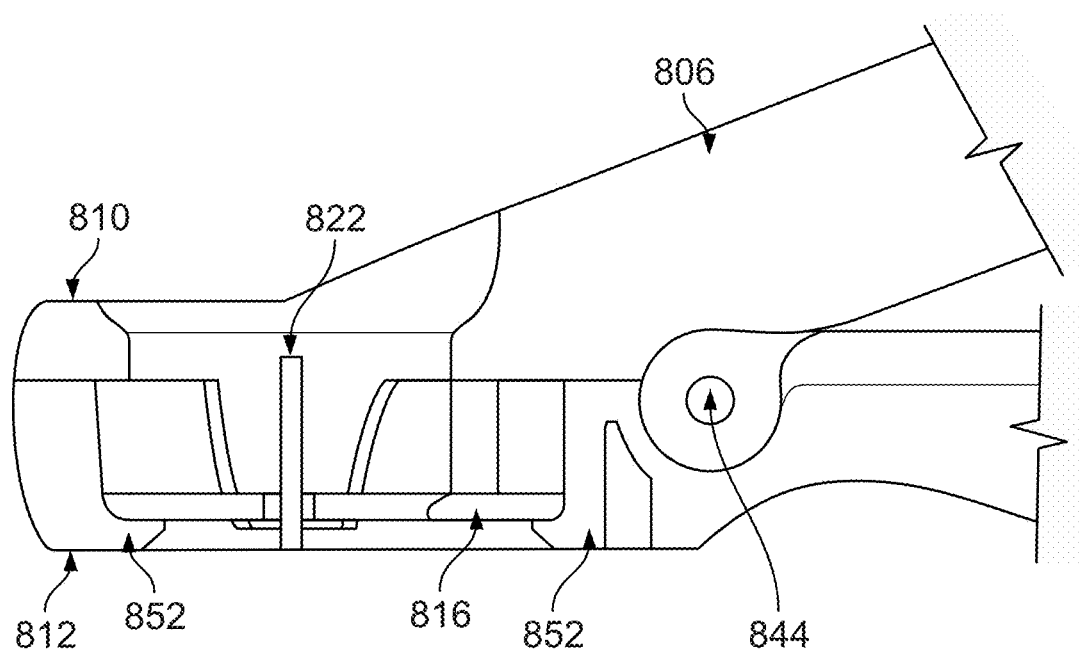
FIGS. 10A-C are schematics showing the inner components of the bottle opener of FIG. 8.
Figure 10B:
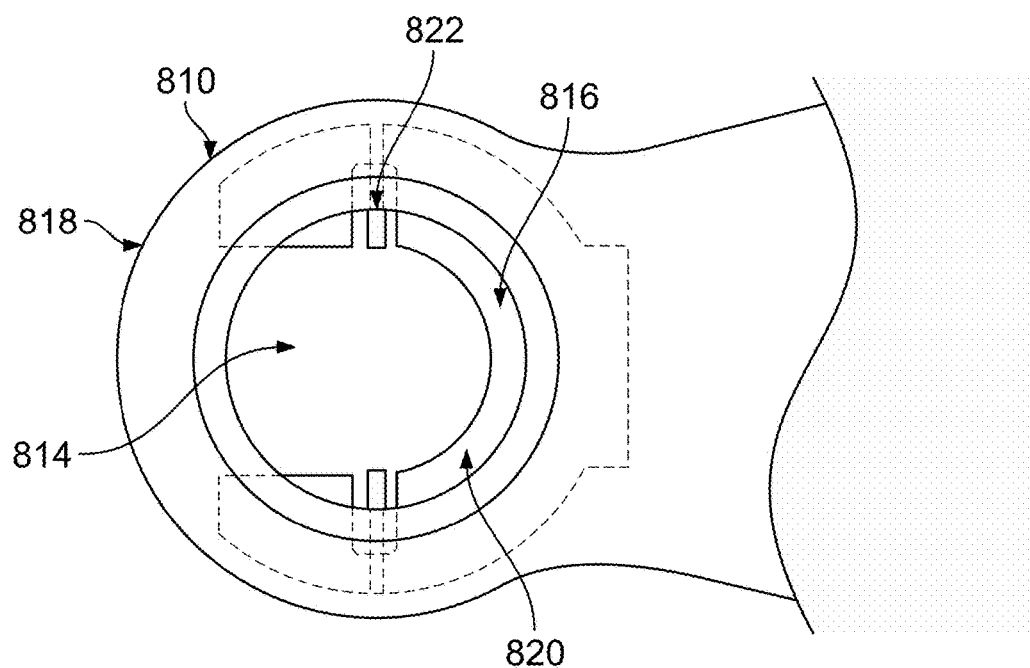

The bottle rest 816 attaches to a bottom portion of the lower body collar 812. As best seen in FIG. 9, the bottle rest 816 is generally U-shaped when seen from above (see FIG. 10B also) and is generally flat in profile (as also seen in FIG. 10A). The bottle rest 816 has a ledge 820 at the inside aspect of the bottle rest 816 (e.g., the inner portion of the bottle rest 816 that defines the perimeter of the central opening 814 of the bottle rest 816). The bottle rest 816 rests on lips 852 of the lower body collar 812 (as best seen in FIG. 10A). The ledge 820 is thin, and sized to fit between a bottle cap and the protrusion generally found near the lip of glass bottles. The ledge 820 of the bottle rest 816 also has cut-outs 830 ranged around the ledge 820. The number of cut-outs generally corresponds to the number of levers 822 in the bottle opener 800. The bottle rest 816 of the opener is what primarily contacts the bottle, e.g., rests against the lip of a glass bottle and at least partially contacts the lower surface of the bottle cap.

The lower body collar 812 generally fits beneath and mates with the upper body collar 810. Each of the lower body collar 812 and upper body collar 810 has various protrusions and recesses 832 that allow the upper body collar 810 to register with the lower body collar 812 when the bottle opener is assembled. The protrusions and recesses 832 are shaped and sized so that the upper body collar 810 slides upward and away from the lower body collar 812 due to downward movement of the upper handle 806. Accordingly the surfaces of the upper body collar 810 and the lower body collar 812 that contact each other are smooth so as to reduce friction. In some instances a lubricant can be placed on these surfaces, or the surfaces may be made of low-friction material. As best seen in FIG. 9, the upper body collar 810 has one or more lever recesses 834 on its inner surface (e.g., the surface defining the perimeter of the central opening 814).

Figure 10C:
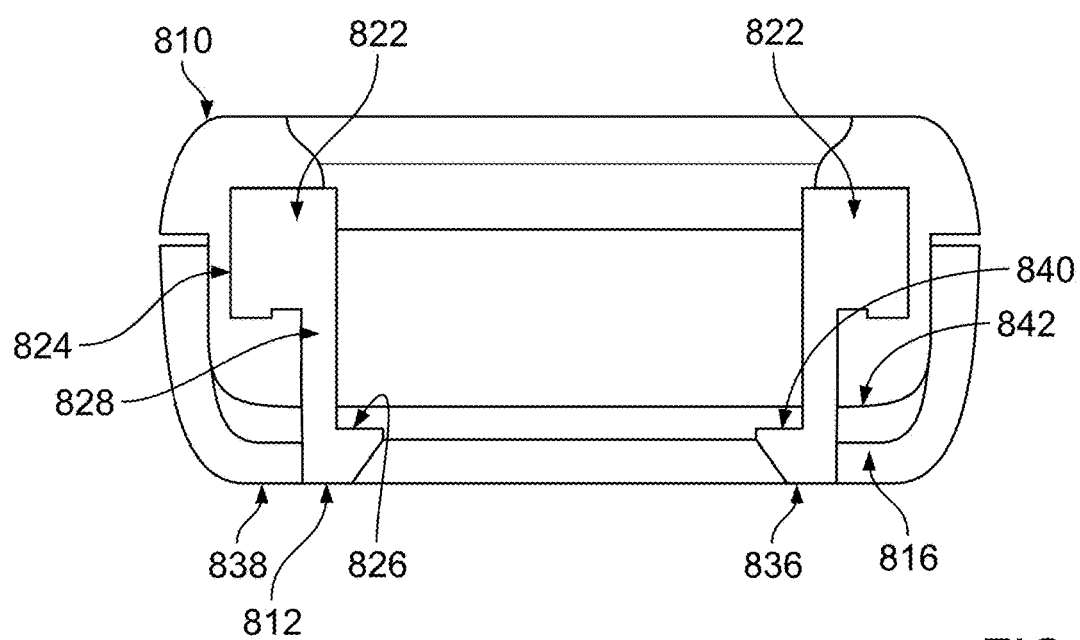

The bottle opener 800 includes one or more levers 822. As best seen in FIG. 10C, each lever 822 has an upper protrusion 824 and a lower protrusion 826 joined by a lever body 828. The levers 822 can be one, two, three or more in quantity. The levers 807 can be made of a metallic, plastic, or other materials necessary for ejecting the bottle cap. The bottle opener 800 can eject a bottle cap with the described lever mechanism and/or by other methods necessary for ejecting the bottle cap, such as by twisting the cap, sliding the cap vertically, horizontally, or in another direction, applying a magnetic force to the cap, or applying pressure to the bottle, to the bottle cap, and/or to the liquid inside the bottle (e.g., by laser technology).

The lower body collar 812 works in conjunction with the upper body collar 810, the ledge 820, and the levers 822. Each lever recess 834 on the inner surface of the upper body collar 810 is sized and shaped such that the upper protrusion 824 of a lever and part of the lever body 828 fit into the lever recess 834. Once the bottle opener 800 is assembled, the lever 822 is held in place with respect to the upper body collar 810 by the interlocking of the upper protrusion 824 of the lever and the lever recess 834. The lower protrusion 826 of the levers 822 fits within the cut-outs 830 of the bottle rest 816. Referring to FIG. 10C, the bottom surface 836 of the lower protrusion 826 of the levers 822 is generally flush with a bottom surface 838 of the bottle rest 816. A top surface 840 of the lower protrusion 826 is generally flush with a bottom surface 842 of the bottle rest 816. In some instances the top surface 840 of the lower protrusion 826 is slightly higher than the bottom surface 842 of the bottle rest 816.

The upper handle 806 is pivotally attached to the lower handle 808 at a pivot point 844 with a suitable pivot arrangement. For example, referring to FIG. 9, a pin 846 can be part of a pin and hole arrangement, and pierce appropriately sized holes 848 in the upper handle 806 and the lower handle 808. Other arrangements as is known in the art are also possible. Due to the arrangement at the pivot point 844, the upper handle 806 can be moved (e.g., grasped and pressed by a user) so that it rotates about the pivot point 844, pivoting the upper handle 806 with respect to the lower handle 808 and thereby moving the upper body collar 810 with respect to the lower body collar 812. A rotation stop 850 can limit movement of the upper handle 806 with respect to the lower handle 808. The rotation stop 850 can be attached to one or both of the upper handle 806 and the lower handle 808. The rotation stop 850 can connect to the lower handle 808 and act as a spring to cause the upper handle 806 to return to the open resting position. The rotation stop 850 can include a spring-like portion and a non-spring-like portion that acts to permit the user to firmly press the upper handle 806 against the lower handle 808. In general, the bottle opener 800 and its different components can be made of metal, plastic, glass, carbon fiber, ceramic, another material, or any combination thereof. Furthermore, the bottle opener 800 and its components can be any color or any combination of multiple different colors. In some implementations, the upper handle 806 and the lower handle 808 can be made of plastic, and the other parts of the bottle opener 800 described above can be made of metal, or other sturdy material.

To operate the bottle opener 800, a user first places the bottle opener around the top of a bottle, sliding the bottle through the gap 818 of the bottle opener 800, and placing the bottle rest 816 against the top surface of the bottle's lip, providing a stabilizing force for the bottle opener 800. When in place, the lower protrusions 826 of the levers 822 can also rest against the top surface of the bottle lip. The lower protrusions 826 of the levers 822 also press against the lower edge of the bottle cap. In some instances, the user may press slightly on the handle 804 to bring the protrusion 826 into contact with the bottle cap.

To eject the bottle cap, the user pushes forcefully and rapidly down on the upper handle 806. Due to the pivot point 844, the upper handle 806 rotates, creating an upward force on the upper body collar 810 and causing it to slide upwards and away from the lower body collar 812. As the upper protrusion 824 of the lever is fixed within the lever recess 834 of the upper body collar 810, this causes the levers 822 to slide upwards and exert a force on the bottle cap. This force ejects the bottle cap off of the bottle.

In some instances the end of the levers 822 (e.g., the lower protrusions 826) that contact the bottle cap can have a hook or curved shape so as to better fit under the bottle cap, or fit between the bottle cap and the bottle. Pulling down the handle 804 of the bottle opener provides enough force to the levers 822 for an ejectment movement and for the bottle cap to be ejected into the air. The ejection of the bottle cap is done at a speed that allows it to propel approximately 5 to 10 feet or more in the air. In some implementations, the bottle opener 800 can enable the user to control the ejection speed and height of the bottle cap. For example, the bottle opener 800 can include one or more buttons or switches which allow the user to set a desired ejection speed and/or height. One or more stoppers (e.g., the rotation stop 850) or other mechanical devices in the bottle opener 800 can then set the maximum force to be applied to the bottle cap by the levers 822 based on the user input. In this manner, the user can set the ejection height of the bottle cap anywhere between 0 feet in the air (e.g., prying off the bottle cap) and 10 feet or more in the air. The levers can be one, two, three or more in quantity. The force applied to each of the levers 822 can be identical or be varying in force applied to each of the lever 822 or varying in the amount of force applied to the cap by each lever 822. This can allow the cap to be ejected in a certain direction; either straight up in the air or in any possible direction according to how the levers 822 are applied and fixed in the bottle opener. The levers 822 can be at attached at different angles (e.g., the lever recesses 834 can be at a slight angle rather than at a right angle as shown) or be longer or shorter than each other and thus have differing lever arms and provide differing amounts of force to the bottle cap. For example, the lower protrusion 826 of one lever 822 may be thicker or thinner than the lower protrusion 826 of a second lever 822; such disparity in size will change the magnitude and direction of the forces acting on a bottle cap as the bottle opener 800 ejects it into the air.

In some implementations, a safety stopper 852 may limit the upward travel of the bottle cap while leaving a popping sound of an ejected bottle cap largely unaffected, providing the same functionality as the safety stopper described in relation to FIG. 1. When the safety stopper 852 is in a deployed state (as shown in FIG. 9), it may partially occlude the central opening 814 of the bottle opener 800. A safety stopper deployment mechanism 854 can be implemented to deploy and retract the safety stopper. In some cases, the safety stopper deployment mechanism 854 can be a button or a slide. Deployment and retraction of the safety stopper 852 can be manual or automatic (e.g., via a button added to the bottle opener 800, in response to ejection of the bottle cap, as part of the expansion and/or contraction of the multiple bottle opener, etc.). In some cases, the stopper 852 can include a magnetic material, a suction device, and/or another mechanism to catch each bottle cap as it is ejected. Once captured, the bottle cap can be disposed of by ejecting it from the safety stopper 852 (e.g., via an ejection mechanism coupled with the safety stopper, by retracting the safety stopper, etc.). In some implementations, the safety stopper 852 can store one or more bottle caps in the handle 804 or another compartment attached to the bottle opener 800 for later disposal. The handle 804 can include one or more magnets, suction devices, and/or another mechanism to organize and store the bottle caps in a space-efficient manner. The handle 804 can also include an indicator that lets the user know how many bottle caps are stored in the handle and when the handle's storage is full.

Alternatively, or in addition, to the safety stopper 852, the bottle opener can include an ejectable net 860 for catching a flying bottle cap. The ejectable net 860 can be made of various materials and can be foldable or collapsible to fit within the lower body collar 812 or the lower handle 808. The ejectable net 860 can be deployed and retracted automatically or manually by pressing a net deployment button 858. While the net deployment button 858 is shown at a side of the lower handle 808, it is understood that the net deployment button 858 can be located anywhere along the surface of the bottle opener 800. In one example, when the net deployment button 858 is pressed, the net 860 is ejected from either side of the lower body collar 812 to catch the flying bottle cap. In some examples, the net 860 can be deployed from other parts of the lower body collar 812 or the lower handle 804.

In some embodiments, the bottom handle can be used as a standalone bottle popper without use of the top handle. The user can simply press down on the handle which would allow the portion of the popper that first contacts the top of the bottle cap to pivot underneath the bottle cap, ejecting it into the air. The safety stopper can slide out, attached or folded out from the handle. The safety stopper will be able to collect the popped bottle caps into the handle. Once full, the safety stopper can be opened to discard the bottle caps.

Figure 11:
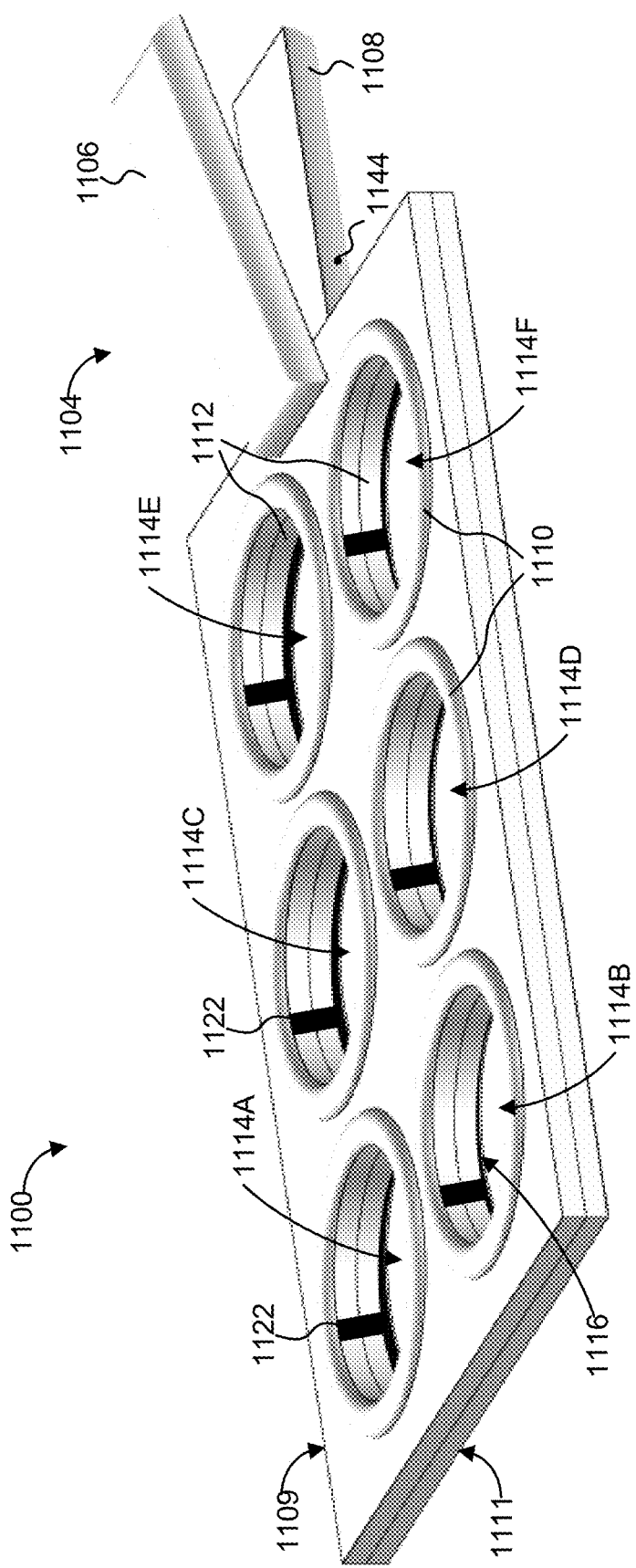
FIGS. 11-12 are schematics of a third embodiment of a bottle opener.
Figure 12:
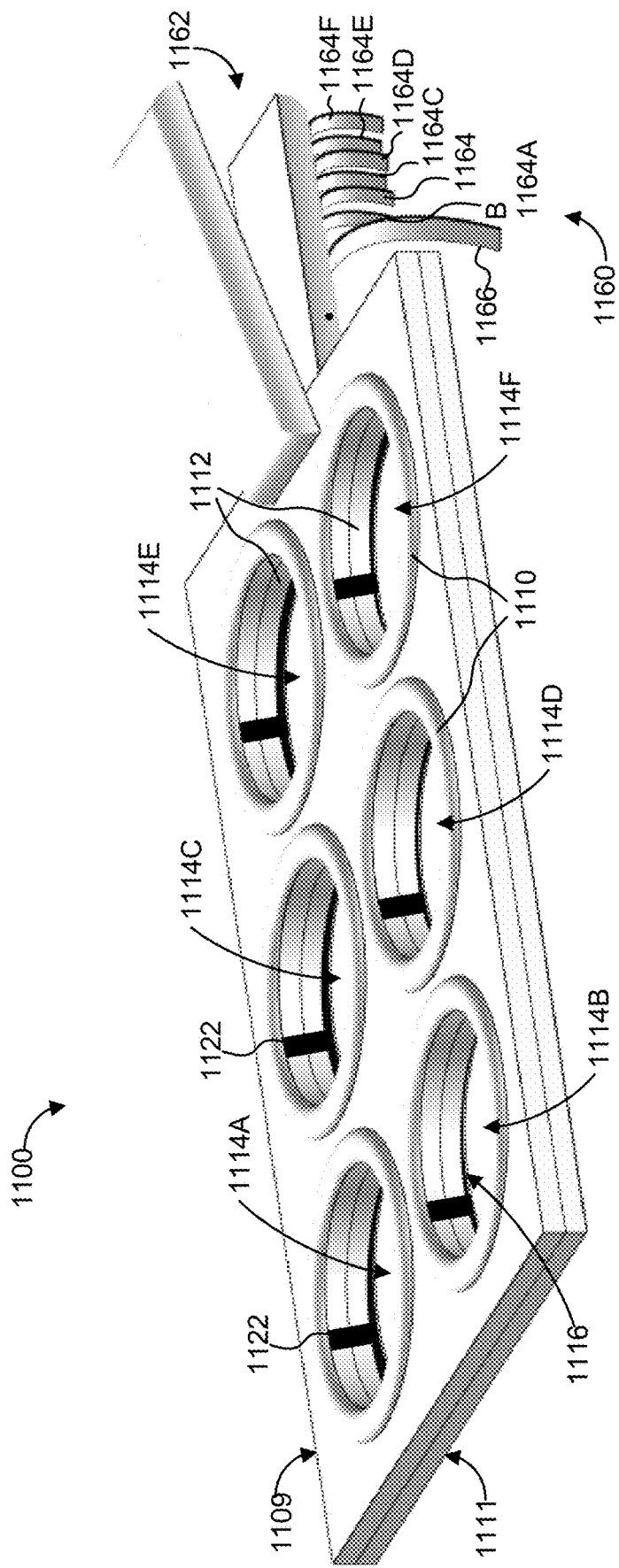

FIGS. 11 and 12 illustrate a third embodiment of a bottle opener 1100 that improves the user experience of opening one or more bottles by allowing the cap of each bottle to be ejected into the air simultaneously or sequentially. Levers or other ejection mechanisms inside the bottle opener 1100 attach underneath each bottle's cap, and a user pressing down on a handle 1104 of the bottle opener 1100 causes each bottle cap to be removed from the bottle and ejected into the air.

The bottle opener 1100 can include one or more of the features described above with respect to FIG. 1 and bottle opener 100 and FIGS. 8, 9, 10A, 10B, and 10C and bottle opener 800, e.g., a display, scanners, temperature sensors, wireless transmitter, air purification slots, sound speakers, microphones, geo mapping technology, a breathalyzer, a fingerprint scanner, one-handed operation, an ejectable net and/or a safety stopper, among others. The bottle opener 1100 can be waterproof, heatproof, and coldproof. It can be durable to withstand falls and other hazardous situations.

In general, the bottle opener 1100 can be configured to open any number of bottles simultaneously or sequentially, including two (2) bottles, four (4) bottles, twelve (12) bottles, eighteen (18) bottles, twenty-four (24) bottles, thirty (30) bottles, and other varying numbers of bottles. For example, the illustrations in FIGS. 11 and 12 depict the bottle opener 1100 configured to open six (6) bottles simultaneously or sequentially. In some implementations, the bottle opener 1100 can be adjustable to accommodate a variable number of bottles. For instance, the bottle opener 1100 can include one or more hinges and/or sliding mechanisms that allow the bottle opener 1100 to increase or decrease the number of holes available for opening bottles. A user can expand or contract the bottle opener 1100 manually or automatically, such as by using a button or switch included on the bottle opener 1100. In some cases, one or more of the components of the bottle opener 1100 can be modular and/or interchangeable to allow the bottle opener 1100 to open a variable number of bottles. For example, the components that make up the opening and ejection mechanism for each individual bottle can be modular to allow the components to be connected in any arrangement and open any number of bottles. The bottle opener 1100 can also include an enclosure that houses two or more of the bottle openers described herein to open multiple bottles. In other implementations, the bottle opener 1100 can have fixed outer dimensions designed to facilitate the opening of a predetermined number of bottles. As a non-limiting example, the bottle opener 1100 can be configured to open 6 bottles arranged in a container (e.g. a box, a beer carrier, etc.) having the following dimensions: 7½" Long (19.5 cm)×5" Wide (12.7 cm)×8¼" Tall (20.95 cm). Alternatively, the bottle opener 1100 can be configured to open 24 bottles arranged in a container having the following dimensions: 2⅝×2⅝×9⅝".

FIGS. 11 and 12 show the mechanical workings of the bottle opener 1100 and its components. As illustrated in FIG. 11, in some implementations, the bottle opener 1100 has a pivotable handle 1104 that creates the action of removing a bottle cap from one or more bottles. The pivotable handle 1104 has two portions, including an upper handle 1106 and a lower handle 1108. The upper handle 1106 can pivot with respect to the lower handle 1108, or vice versa. The top surface of the upper handle 1106 is smooth so that brands can print their logos on the handle surface. In some implementations, an upper plate 1109 is attached to the upper handle 1106, and a lower plate 1111 is attached to the lower handle 1108. Although depicted as separate pieces in FIGS. 11 and 12, in some implementations the upper plate 1109 and the lower plate 1111 can be a single part. The upper plate 1109 includes a plurality of upper body collars 1110, and the lower plate 1111 includes a plurality of lower body collars 1112. Each upper body collar 1110 is slidable relative to the corresponding lower body collar 1112. Additionally, each lower body collar 1112 is in contact with a bottle rest 1116. Each of the upper body collars 1110, the lower body collars 1112, and the bottle rest 1116 may be formed from a single part or multiple separate parts for each of the bottles to be opened by the bottle opener 1100.

The upper body collars 1110 and the lower body collars 1112, as well as the bottle rest 1116, form a plurality of central openings 1114A-F to accommodate multiple bottles. The central openings 1114A-F can be spaced a predetermined distance apart to allow multiple bottles housed in standard packaging to easily slide into the bottle opener 1100. For example, the distance between the centers of adjacent central openings 1114A-F can be about 1 inches, about 1.5 inches, about 2 inches, or about any other length corresponding to the spacing of bottles in a container. In some implementations, the central openings 1114A-F can be adjustable to accommodate varying bottle shapes and/or varying distances between adjacent bottles. When the upper body collars 1110, the lower body collars 1112, and the bottle rest 1116 are assembled, the central openings 1114A-F allow for the bottle cap of each bottle to be ejected into the air. Each upper body collar 1110 has a generally annular portion around one of the central openings 1114A-F, while each of the lower body collars 1112 and the bottle rest 1116 have a gap around a portion of the central opening 1114A-F. Each gap allows a bottle top and bottle cap to be easily inserted in the bottle opener 1100.

Each lower body collar 1112 generally fits beneath and mates with the corresponding upper body collar 1110. Each of the lower body collars 1112 and upper body collars 1110 has various protrusions and recesses that allow the upper body collar 1110 to register with the corresponding lower body collar 1112 when the bottle opener is assembled. The protrusions and recesses are shaped and sized so that the upper body collar 1110 slides upward and away from the lower body collar 1112 due to movement of the upper handle 1106. Accordingly, the surfaces of each upper body collar 1110 and lower body collar 1112 that contact each other are smooth so as to reduce friction. In some instances a lubricant can be placed on these surfaces, or the surfaces may be made of low-friction material.

The bottle opener 1100 can include one or more levers 1122 for each bottle cap. The levers 1122 can be made of a metallic, plastic, or other materials necessary for ejecting the bottle cap. The bottle opener 1100 can eject a bottle cap with the described lever mechanism and/or by other methods necessary for ejecting the bottle cap, such as by twisting the cap, sliding the cap vertically, horizontally, or in another direction, applying a magnetic force to the cap, or applying pressure to the bottle, to the bottle cap, and/or to the liquid inside the bottle (e.g., by laser technology).

The upper handle 1106 is pivotally attached to the lower handle 1108 at a pivot point 1144 with a suitable pivot arrangement. For example, a pin can be part of a pin and hole arrangement, and can pierce appropriately sized holes in the upper handle 1106 and the lower handle 1108 at the pivot point 1144. Other arrangements as is known in the art are also possible. Due to the arrangement at the pivot point 1144, the upper handle 1106 can be moved (e.g., grasped and pressed by a user) so that it rotates about the pivot point 1144, pivoting the upper handle 1106 with respect to the lower handle 1108 and thereby moving one or more of the upper body collars 1110 with respect to the lower body collars 1112. A rotation stop can limit movement of the upper handle 1106 with respect to the lower handle 1108. The rotation stop can be attached to one or both of the upper handle 1106 and the lower handle 1108. The rotation stop can connect to the lower handle 1108 and act as a spring to cause the upper handle 1106 to return to the open resting position. The rotation stop can include a spring-like portion and a non-spring-like portion that acts to permit the user to firmly press the upper handle 1106 against the lower handle 1108. The bottle opener 1100 and its different components can be made of metal, plastic, glass, carbon fiber, ceramic, another material, or any combination thereof. Furthermore, the bottle opener 1100 and its components can be any color or any combination of multiple different colors.

To operate the bottle opener 1100, a user first places the bottle opener around the top of one or more bottles, sliding each bottle through the gap in one of the central openings 1114A-F, and placing the bottle rest 1116 against the top surface of each bottle's lip, providing a stabilizing force for the bottle opener 1100. To eject the bottle cap, the user pushes forcefully and rapidly down on the upper handle 1106. Due to the pivot point 1144, the upper handle 1106 rotates, creating an upward force on one or more of the upper body collars 1110 and causing them to slide upwards and away from the corresponding lower body collars 1112. This causes the levers 1122 to slide upwards and exert a force on one or more bottle caps. This force ejects each bottle cap off of the bottle.

Referring to FIG. 12, in some implementations, a user can operate the bottle opener 1100 using a trigger mechanism 1160 that creates the action of removing a bottle cap from the one or more bottles. The trigger mechanism 1160 can include a handle 1162, one or more individual triggers 1164A-F, and a universal trigger 1166. Each of the individual triggers 1164A-F can be configured to eject a bottle cap through a corresponding one of the central openings 1114A-F. In this case, the bottle opener 1100 can include a single trigger 1164A-F for each of the central openings 1114A-F. Each of the individual triggers 1164A-F can be spaced, for example, between about 0.5 centimeters and about 1.5 centimeters apart along the length of the handle 1162, though other arrangements are within the scope of this disclosure. In other cases, each of the individual triggers 1164A-F can correspond to more than one of the central openings 1164A-F. Thus, the number of individual triggers 1164A-F need not always be equal to the number of central openings 1114A-F.

Each of the individual triggers 1164A-F can be configured to exert the necessary force to eject a bottle cap through each of the one or more corresponding central openings 1114A-F. For example, in some implementations the handle 1162 can be attached to the lower plate 1111 and/or lower body collars 1112, and the individual triggers 1164A-F can be attached to or otherwise coupled with the upper plate 1109 and/or one or more of the upper body collars 1110. Actuation of one or more of the individual triggers 1164A-F can cause one or more of the upper body collars 1110 to slide upwards and away from the corresponding lower body collars 1112. This causes the levers 1122 to slide upwards and exert a force on the respective bottle caps, ejecting the bottle caps off of the bottle. In other implementations, the individual triggers 1164A-F can be coupled with a different ejection mechanism configured to exert the force necessary to eject a bottle cap through each of the one or more corresponding central openings 1114A-F (e.g., by twisting the bottle cap, sliding the bottle cap vertically, horizontally, or in another direction, applying a magnetic force to the cap, or applying pressure to the bottle, to the bottle cap, and/or to the liquid inside the bottle 102). Accordingly, a user can selectively and sequentially open one or more bottles in the bottle opener 1100 by actuating one or more of the individual triggers 1164A-F. The universal trigger 1166 can be configured to eject some or all of the bottle caps in the bottle opener 1100 simultaneously, for example, by actuating all of the individual triggers 1164A-F simultaneously, by applying the necessary force directly to the upper plate 1109, the lower plate 1111, the upper body collar 1110, the lower body collar 1112, and/or the levers 1122, etc. In some implementations, the individual triggers 1164A-F and/or the universal trigger 1166 can be digital triggers, and the bottle opener 1100 can cause one or more of the bottle caps to eject in response to receiving a signal indicating that the individual triggers 1164A-F and/or the universal trigger 1166 were actuated.

In some instances the end of the levers 1122 that contact the bottle cap can have a hook or curved shape so as to better fit under the bottle cap, or fit between the bottle cap and the bottle. The levers for each bottle cap can be one, two, three or more in quantity. Pulling down the handle 1104 or actuating trigger mechanism 1160 of the bottle opener provides enough force to the levers 1122 for an ejectment movement and for each bottle cap to be ejected into the air. The ejection of each bottle cap is done at a speed that allows it to propel approximately 5 to 10 feet or more in the air. In some implementations, the bottle opener 1100 can enable the user to control the ejection speed and height of each bottle cap. For example, the bottle opener 1100 can include one or more buttons or switches which allow the user to set a desired ejection speed and/or height for some or all of the bottle caps. One or more stoppers (e.g., the rotation stop) or other mechanical devices in the bottle opener 1100 can then set the maximum force to be applied to the bottle cap by the levers 1122 based on the user input. In this manner, the user can set the ejection height of a particular bottle cap anywhere between 0 feet in the air (e.g., prying off the bottle cap) and 10 feet or more in the air.

In some implementations, some or all of the bottle caps in the bottle opener 1100 can be ejected simultaneously, regardless of the type of bottle or bottle cap. In other implementations, one or more of the bottles caps in the bottle opener 1100 can be ejected sequentially in a desired arrangement or order. The bottle opener 1100 can allow a user to select which bottles to open during a given ejection, as well as the order to open them in. In some cases, this feature can be automatic, such as through use of one or more buttons or switches provided on the bottle opener 1100 to select the bottles for opening and the opening order. In other cases, this feature can be manual, for example, by use of the one or more individual triggers 1164A-F (i.e., to open some or all of the bottles in an order) or use of the universal trigger 1166 (i.e., to open all bottles simultaneously). The force applied to each of the levers 1122 can be identical or be varying in force applied to each of the lever 1122 or varying in the amount of force applied to the cap by each lever 1122. This can allow the cap to be ejected in a certain direction; either straight up in the air or in any possible direction according to how the levers 1122 are applied and fixed in the bottle opener. The levers 1122 can be attached at different angles or be longer or shorter than each other and thus have differing lever arms and provide differing amounts of force to the bottle cap.

In some implementations, the bottle opener 1100 can include a safety stopper as described above. The safety stopper can control the ejection of the bottle cap while still allowing for the popping sound to take place. In some implementations, the safety stopper can slide or fold into or around the handle 1162 or another part of the bottle opener 1100 to allow a user to optionally deploy the safety stopper. Deployment and retraction of the safety stopper can be manual or automatic (e.g., via a button added to the bottle opener 1100, in response to ejection of the bottle cap, as part of the expansion and/or contraction of the multiple bottle opener, etc.). In some cases, the stopper can include a magnetic material, a suction device, and/or another mechanism to catch each bottle cap as it is ejected. Once captured, the bottle cap can be disposed of by ejecting it from the safety stopper (e.g., via an ejection mechanism coupled with the safety stopper, by retracting the safety stopper, etc.). In some implementations, the safety stopper can store one or more bottle caps in the handle 1162 or another compartment attached to the bottle opener 1100 for later disposal. The handle 1162 can include one or more magnets, suction devices, and/or another mechanism to organize and store the bottle caps in a space-efficient manner. The handle 1162 can also include an indicator that lets the user know how many bottle caps are stored in the handle and when the handle's storage is full.

In some implementations, the bottle opener 1100 can include one or more attachments or accessories as described above. For example, the bottle opener 1100 can include sparklers or confetti configured to deploy upon user interaction and/or ejection of the bottle cap. In some cases, the sparklers or confetti can be configured to deploy during ejection of each bottle cap or during ejection of specific bottle caps, such as the first or the last bottle cap.

In some implementations, the bottle opener 1100 can open one or more bottles automatically (e.g., without user interaction with the handle 1104, the trigger mechanism 1160, etc.). For example, the bottle opener 1100 can automatically engage the ejection mechanisms described herein to open one or more bottles in response to detecting the presence of the one or more bottles in the central openings 1114A-F (e.g., by using scanners or other detection mechanisms).

Figure 13:
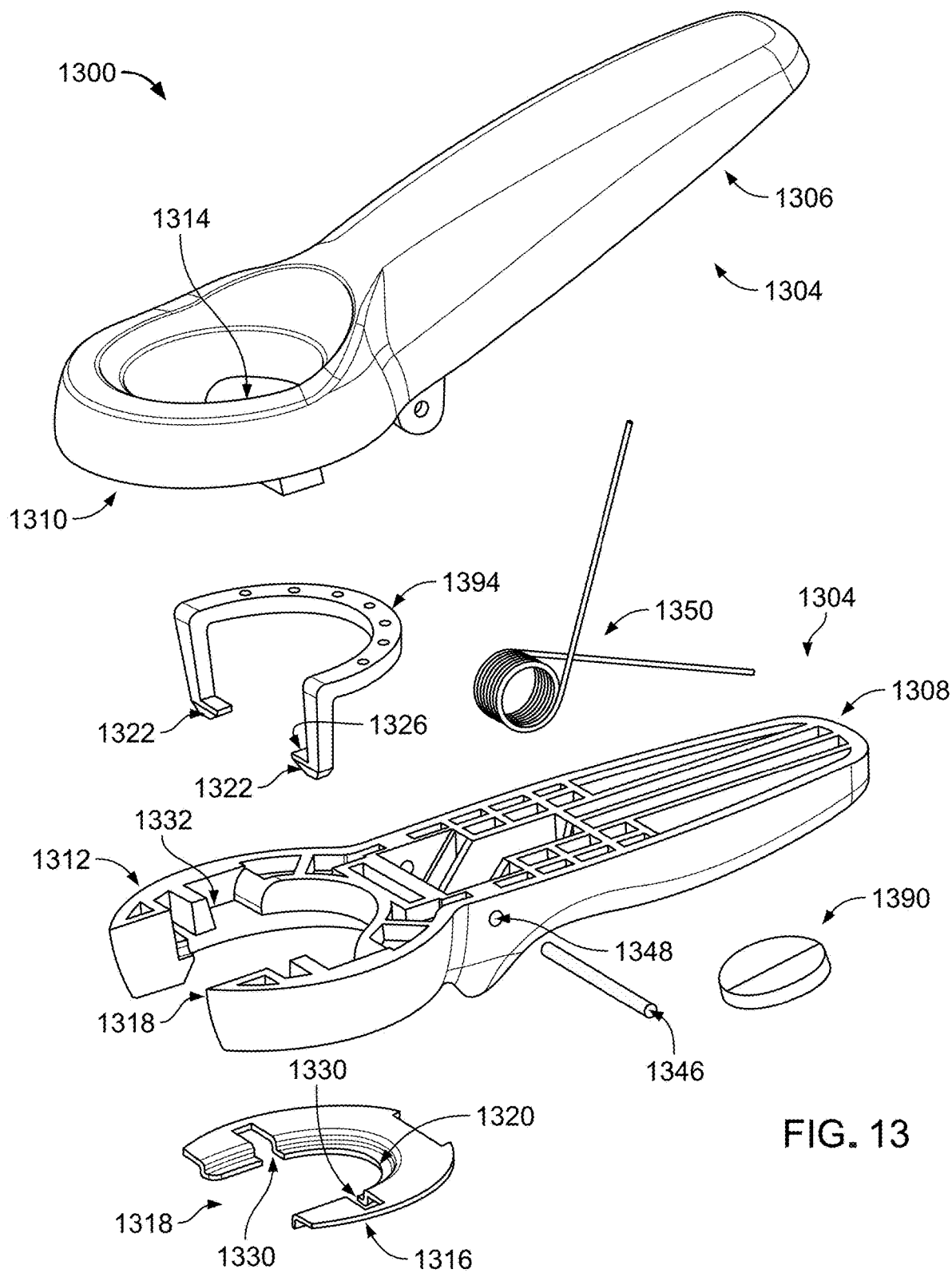
FIG. 13 is an exploded view of an embodiment of a bottle opener.

FIG. 13 illustrates an embodiment of a bottle opener 1300 that improves the user experience of opening a bottle by allowing the cap of the bottle to be ejected into the air. Levers inside the bottle opener 1300 attach underneath the bottle's cap, and a user pressing up on a handle 1304 of the bottle opener 1300 causes the bottle cap to be removed from the bottle and ejected into the air. The lower portion of the bottle opener 1300 can be a standalone bottle opener. This provides a single-action simplified technique of opening the bottle that can be performed with just one hand.

The bottle opener 1300 can include one or more of the features described above with respect to FIG. 1 and bottle opener 100, e.g., a display, scanners, temperature sensors, wireless transmitter, air purification slots, sound speakers, microphones, geo mapping technology, a breathalyzer, a fingerprint scanner, and/or a safety stopper, among others. The bottle opener 1300 can be waterproof, heatproof, and coldproof. It can be durable to withstand falls and other hazardous situations.

The bottle opener 1300 is similar in many respects to the opener 800 shown in FIG. 8. In some implementations, the bottle opener 1300 has a pivotable handle 1304 that creates the action of removing a bottle cap from a bottle. The pivotable handle 1304 has two portions, including an upper handle 1306 and a lower handle 1308. The lower handle 1308 can pivot with respect to the upper handle 1306 (or vice versa). The top surface of the upper handle 1306 is smooth so that brands can print their logos on the handle surface. An upper body collar 1310 is attached to the upper handle 1306 and a lower body collar 1312 is attached to the lower handle 1308. In some cases, the upper body collar 1310 may be considered an outer body collar and the lower body collar 1312 may be considered an inner body collar. The upper body collar 1310 is slidable relative to the lower body collar 1312. Additionally, the lower body collar 1312 is in contact with a bottle rest 1316. The upper body collar 1310 and the lower body collar 1312 as well as the bottle rest 1316 each has a central opening 1314. When the upper body collar 1310, lower body collar 1312, and the bottle rest 1316 are assembled, the central opening 1314 allows for the bottle cap to be ejected into the air.

The upper body collar 1310 is generally annular in shape while the lower body collar 1312 and bottle rest 1316 can each optionally include a gap, allowing a bottle top and bottle cap to be easily inserted in the bottle opener 1300. While the gap 1318 is shown at a front aspect of the bottle opener, it is understood that the gap can be at any portion of the lower body collar 1312 and the bottle rest 1316, or the gap may not be present at all.

The bottle rest 1316 attaches to a bottom portion of the lower body collar 1312. The bottle rest 1316 is generally U-shaped when seen from above and is generally flat in profile, although the bottle rest 1316 has a ledge 1320 at the inside aspect of the bottle rest 1316 (e.g., the inner portion of the bottle rest 1316 that defines the perimeter of the central opening 1314 of the bottle rest 1316). The ledge 1320 is thin, and sized to fit between a bottle cap and the protrusion generally found near the lip of glass bottles. The ledge 1320 of the bottle rest 1316 also has cut-outs 1330 ranged around the ledge 1320. The number of cut-outs generally corresponds to the number of levers 1322 in the bottle opener 1300. The bottle rest 1316 of the opener is what primarily contacts the bottle, e.g., rests against the lip of a glass bottle and at least partially contacts the lower surface of the bottle cap.

The lower body collar 1312 generally fits beneath and mates with the upper body collar 1310. Each of the lower body collar 1312 and upper body collar 1310 has various protrusions and recesses 1332 that allow the upper body collar 1310 to register with the lower body collar 1312 when the bottle opener is assembled. The protrusions and recesses 1332 are shaped and sized so that the upper body collar 1310 slides relative to the lower body collar 1312 due to an upward movement of the lower handle 1306. Accordingly the surfaces of the upper body collar 1310 and the lower body collar 1312 that contact each other are smooth so as to reduce friction. In some instances a lubricant can be placed on these surfaces, or the surfaces may be made of low-friction material. The upper body collar 1310 has one or more lever recesses 1334 on its inner surface (e.g., the surface defining the perimeter of the central opening 1314).

The bottle opener 1300 includes one or more levers 1322. Each lever 1322 has a lower protrusion 1326. Unlike the levers shown in FIG. 9, the levers 1322 are attached via a lever fixture 1394. The levers 1322 can be one, two, three or more in quantity. The levers 1307 can be made of a metallic, plastic, or other materials necessary for ejecting the bottle cap. The bottle opener 1300 can eject a bottle cap with the described lever mechanism and/or by other methods necessary for ejecting the bottle cap, such as by twisting the cap, sliding the cap vertically, horizontally, or in another direction, applying a magnetic force to the cap, e.g., with magnet 1390, or applying pressure to the bottle, to the bottle cap, and/or to the liquid inside the bottle (e.g., by laser technology).

The upper handle 1306 is pivotally attached to the lower handle 1308 at a pivot point with a suitable pivot arrangement. For example, a dowel or pin 1346 can be part of a pin and hole arrangement, and pierce appropriately sized holes 1348 in the upper handle 1306 and the lower handle 1308. Other arrangements as is known in the art are also possible. Due to the arrangement at the pivot point 1344, the upper handle 1306 can be moved (e.g., grasped and pressed by a user) so that it rotates about the pivot point, pivoting the upper handle 1306 with respect to the lower handle 1308 and thereby moving the upper body collar 1310 with respect to the lower body collar 1312. A spring 1350 can limit movement of the upper handle 1306 with respect to the lower handle 1308. The spring 1350 can be attached to one or both of the upper handle 1306 and the lower handle 1308 and cause the bottle opener 1300 to return to the open resting position. The spring 1350 can act to permit the user to firmly press the upper handle 1306 against the lower handle 1308. The spring 1350 can be a torsion spring, or other type of spring. In general, the bottle opener 1300 and its different components can be made of metal, plastic, glass, carbon fiber, ceramic, another material, or any combination thereof. Furthermore, the bottle opener 1300 and its components can be any color or any combination of multiple different colors. In some implementations, the upper handle 1306 and the lower handle 1308 can be made of plastic, and the other parts of the bottle opener 1300 described above can be made of metal, or other sturdy material.

The bottle opener 1300 is operated similarly to the bottle opener 800 of FIG. 9.

Figure 14:
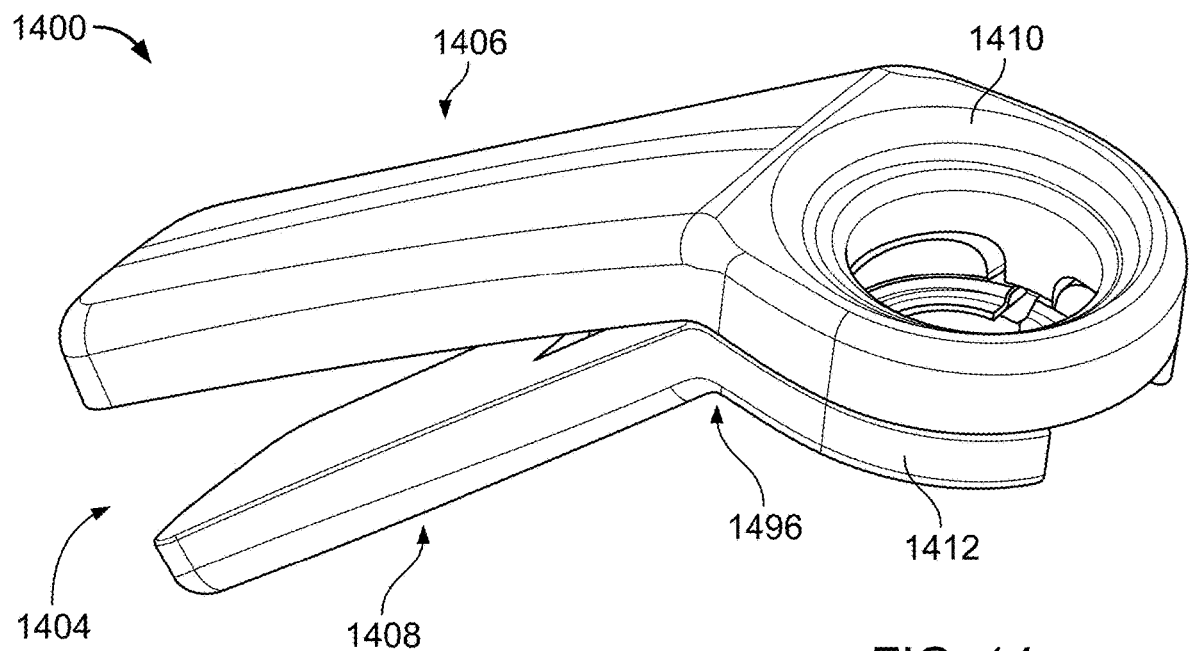
FIG. 14 is a schematic of an embodiment of a bottle opener with a bent handle.

FIG. 14 is a schematic of an embodiment of a bottle opener 1400. The bottle opener 1400 can similar to the above-described embodiments, such as bottle opener 100, 800, or bottle opener 1300. However, the bottle opener 1400 has a handle 1404 that is bent at an angle with respect to the bottle opener's upper body collar 1410 and lower body collar 1412, at bend 1496. The angle can be between 30° and 60°, e.g., 45°.

Figure 15:
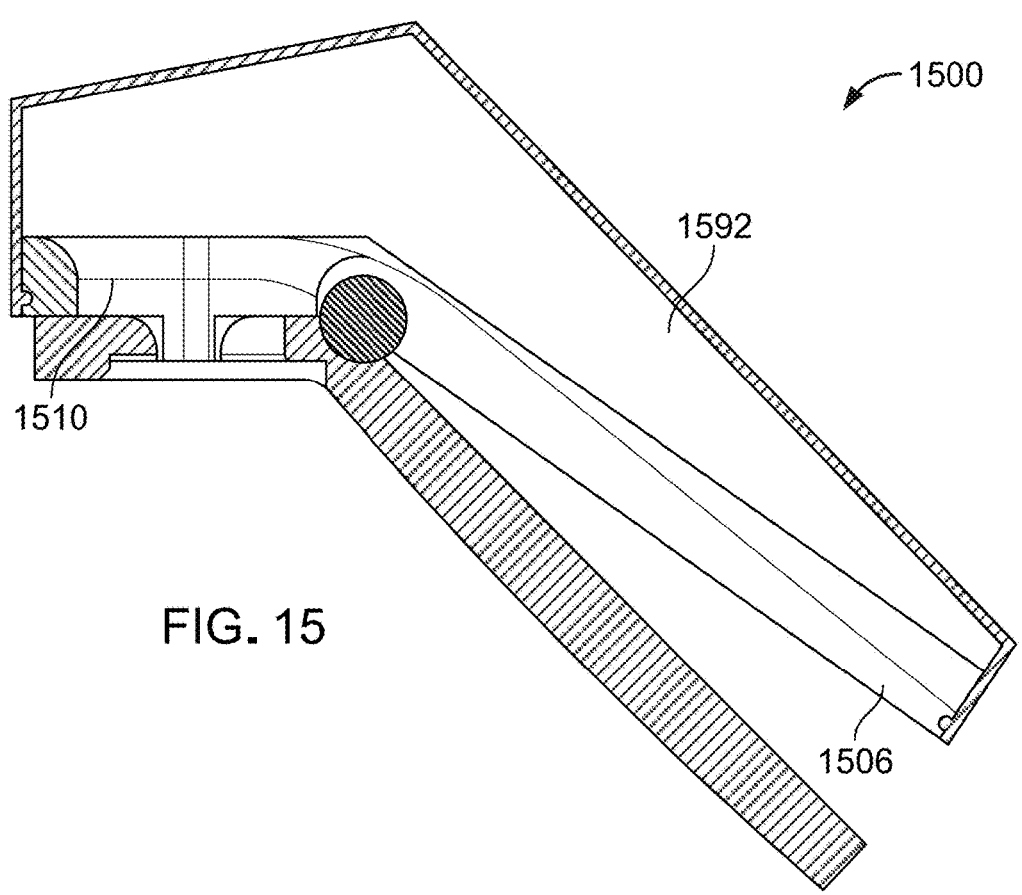
FIG. 15 is a schematic of an embodiment of a bottle opener with a bent handle and an ejected bottle cap collection space.

FIG. 15 is a schematic of an embodiment of a bottle opener 1500 with a bent handle, similar to opener 1400 in FIG. 14. The bottle opener 1500 has the additional feature of an ejected bottle cap collector 1592. The ejected bottle cap collector 1592 can be in the form of a cap or attachment that fits over the upper body collar 1510. As shown, the ejected bottle cap collector 1592 can also fit over at least a portion of the top handle 1506.

In some embodiments, the bottom handle can be used as a standalone bottle popper without use of the top handle. The user can simply press down on the handle which would allow the portion of the popper that first contacts the top of the bottle cap to pivot underneath the bottle cap, ejecting it into the air, or into the ejected bottle cap collector.

The ejected bottle cap collector 1592 acts as the safety stopper described above, and controls the ejection of the bottle cap while still allowing for the popping sound to take place. Here, the safety stopper or ejected bottle cap collector 1592 is a hooded enclosure that catches upwardly travelling bottle cap. In some implementations, the safety stopper in the form of the ejected bottle cap collector 1592 can be removably attached to the bottle opener 1500. In other implementations, the safety stopper can slide or fold into or around the bottle opener 1500 to allow a user to optionally deploy the safety stopper. Once captured, the bottle cap can be disposed of by ejecting it from the ejected bottle cap collector 1592 (e.g., via an ejection mechanism coupled with the safety stopper, by retracting the safety stopper, etc.). In some implementations, the ejected bottle cap collector 1592 can store the bottle cap in a compartment within the bottle opener 1500 for later disposal.

Other implementations are within the scope of the following claims. For example, the actions recited in the claims can be performed in a different order and still achieve desirable results. For example, the bottle opener can also include sensors and emitters that provide purifying ultra violet (UV) lights, antimicrobial, fiber optic and other light technology to clean and detect the caloric and other nutritional/informational qualities of contents inside a bottle. The components of the bottle poppers can be scaled to handle different types of bottles, jars, cans, and other types of containers with similar types of caps, lids, etc. Nevertheless, it will be understood that various modifications may be made without departing from the spirit and scope of the invention. Accordingly, other embodiments are within the scope of the following claims.

What is claimed is:

1. A bottle opener apparatus comprising:
    a bottle rest configured to rest on a portion of a bottle placed within the bottle opener;
    a lower body collar attached to the bottle rest;
    an upper body collar slidably connected to the lower body collar;
    one or more levers attached to the upper body collar and to the lower body collar, the one or more levers configured to remove a bottle cap from the bottle and eject the bottle cap into the air when the upper collar slides relative to the inner collar in an ejection movement;
    one or more sensors configured to collect data when the bottle is placed within the inner collar; and
    a transmitter configured to transmit the collected data to an external receiver.

2. The apparatus of claim 1, wherein the levers are fixedly attached to the upper body collar at one end and slidably attached to the lower body collar near a second end.

3. The apparatus of claim 1, further comprising an upper handle attached to the upper body collar and a lower handle attached to the lower body collar.

4. The apparatus of claim 3, wherein the upper handle is pivotably attached to the lower handle.

5. The apparatus of claim 4, wherein the upper handle is configured to pivotably rotate with respect to the lower handle and thereby slide the upper body collar with respect to the lower body collar.

6. The apparatus of claim 3, wherein the upper handle is attached to the upper body collar and the lower handle is attached to the lower body collar at angle between 30 and 60 degrees.

7. The apparatus of claim 1, wherein the levers are configured to eject the bottle cap into the air straight from the bottle opener or at an angle.

8. The apparatus of claim 1, wherein the levers are configured to eject the bottle cap into the air straight from the bottle opener or at an angle.

\* \* \* \* \*